(12) United States Patent
Freer et al.

(10) Patent No.: US 10,669,088 B2
(45) Date of Patent: Jun. 2, 2020

(54) EDDY CURRENT JOINT SENSOR

(71) Applicant: Cooper Technologies Company, Houston, TX (US)

(72) Inventors: Benjamin Avery Freer, Syracuse, NY (US); Joseph Michael Manahan, Manlius, NY (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 587 days.

(21) Appl. No.: 15/372,893

(22) Filed: Dec. 8, 2016

(65) Prior Publication Data

US 2017/0184388 A1 Jun. 29, 2017

Related U.S. Application Data

(60) Provisional application No. 62/271,798, filed on Dec. 28, 2015.

(51) Int. Cl.
| | | |
|---|---|---|
| *G01B 7/02* | (2006.01) | |
| *B65D 81/02* | (2006.01) | |
| *G01N 27/90* | (2006.01) | |

(52) U.S. Cl.
CPC ............ *B65D 81/02* (2013.01); *G01B 7/023* (2013.01)

(58) Field of Classification Search
CPC . G01B 7/023; G01B 7/02; G01B 7/06; G01B 7/12; G01B 7/13; G01B 7/14; G01B 7/142; G01B 7/148; B65D 81/02
See application file for complete search history.

(56) References Cited

U.S. PATENT DOCUMENTS

| | | | | |
|---|---|---|---|---|
| 4,042,876 A | * | 8/1977 | Visioli, Jr. ............. | G01D 5/202 324/207.16 |
| 4,604,251 A | * | 8/1986 | Kuhman .................. | G01B 7/14 264/408 |
| 4,664,281 A | | 5/1987 | Falk et al. | |
| 5,399,968 A | * | 3/1995 | Sheppard ............. | G01N 27/902 324/232 |
| 8,749,230 B1 | | 6/2014 | Fogarty et al. | |

(Continued)

FOREIGN PATENT DOCUMENTS

SU 496614 3/1976

OTHER PUBLICATIONS

T. Schukina, International Search Report and Written Opinion of the International Searching Authority for PCT/US2016/065582, dated Mar. 24, 2017, 7 pages, Federal Institute of Industrial Property, Moscow, Russia.

(Continued)

*Primary Examiner* — Lee E Rodak
(74) *Attorney, Agent, or Firm* — King & Spalding LLP

(57) ABSTRACT

A joint sensing system within an enclosure can include an electrical circuit through which a first current flows, where the first current creates a magnetic field, where the electrical circuit is disposed proximate to a joint of the enclosure. The system can also include a target disposed proximate to the electrical circuit, where the magnetic field induces a plurality of second currents to flow within the target. The system can further include a sensor that measures the plurality of second currents flowing within the target to generate a plurality of measurements. The plurality of measurements can indicate a width of the joint of the enclosure.

18 Claims, 10 Drawing Sheets

(56) References Cited

U.S. PATENT DOCUMENTS

| | | |
|---|---|---|
| 2003/0169036 A1 | 9/2003 | Hrubes et al. |
| 2005/0143944 A1* | 6/2005 | Cech .................. B60R 21/0134 |
| | | 702/115 |
| 2009/0084782 A1* | 4/2009 | Helmer ................. H02G 3/083 |
| | | 220/3.8 |
| 2009/0288529 A1* | 11/2009 | Floyd ....................... B64F 5/60 |
| | | 83/13 |
| 2010/0013464 A1 | 1/2010 | De Huu et al. |
| 2012/0153944 A1* | 6/2012 | Tada .................. G01N 27/9033 |
| | | 324/239 |
| 2012/0183114 A1* | 7/2012 | Bischoff ................ F16L 55/32 |
| | | 376/248 |
| 2013/0241479 A1* | 9/2013 | Wright, Jr. .............. H02H 5/10 |
| | | 320/109 |
| 2017/0138909 A1* | 5/2017 | Ostergren .............. G01N 29/07 |

OTHER PUBLICATIONS

Translation of SU496614 via Lexis Nexis Total Patents, May 22, 2017, 2 pages.

* cited by examiner

EDDY CURRENT JOINT SENSOR

CROSS-REFERENCE TO RELATED APPLICATIONS

This application claims priority under 35 U.S.C. § 119 to U.S. Provisional Patent Application Ser. No. 62/271,798, titled "Eddy Current Joint Sensor" and filed on Dec. 28, 2015, the entire contents of which are hereby incorporated herein by reference.

TECHNICAL FIELD

The present disclosure relates generally to enclosures, and more particularly to systems, methods, and devices for eddy current joint sensors.

BACKGROUND

Enclosures are used in a number of applications and have a number of different sizes and configurations. Such enclosures have one or more electrical devices and/or mechanical devices disposed therein. In certain environments, such as explosion-proof environments, an enclosure must meet certain industry standards to maintain a minimal level of safety. Failure to persistently and properly monitor the compliance of an enclosure with these industry standards can lead to catastrophic damage and extensive cost. Typically, enclosures are inspected or opened on a very infrequent basis, and so a user is often unaware of times when the enclosure fails to comply with applicable industry standards.

Further, enclosures provide no means for detecting small variations in the flame path (described below) that may be the result of maintenance that has been performed. Such variations can be caused by one or more of a number of factors. For example, a variation in the flame path of an enclosure can be caused by debris that is caught in the flame path when the enclosure cover is closed against the enclosure body after maintenance. Similarly, personnel uneducated in the requirements of enclosures located in hazardous locations may unknowingly violate requirements when closing the enclosure (e.g., failure to torque fasteners properly, missing fastening devices).

SUMMARY

In general, in one aspect, the disclosure relates to a joint sensing system within an enclosure. The system can include an electrical circuit through which a first current flows, where the first current creates a magnetic field, where the electrical circuit is disposed proximate to a joint of the enclosure. The system can also include a target disposed proximate to the electrical circuit, where the magnetic field induces a plurality of second currents to flow within the target. The system can further include a sensor that measures the plurality of second currents flowing within the target to generate a plurality of measurements. The plurality of measurements can indicate a width of the joint of the enclosure.

In another aspect, the disclosure can generally relate to an explosion-proof enclosure. The explosion-proof enclosure can include an enclosure body having at least one wall that forms a cavity, where the enclosure body further include a first flange. The explosion-proof enclosure can also include an enclosure cover coupled to the enclosure body, where the enclosure cover includes a second flange, where the first flange is disposed adjacent to the second flange when the enclosure body is coupled to the enclosure cover, where the first flange and the second flange form a flame path therebetween when the enclosure body is coupled to the enclosure cover. The explosion-proof enclosure can further include a joint sensing system. The joint sensing system can include an electrical circuit disposed proximate to the flame path, where the electrical circuit has a first current that flows therethrough, where the first current creates a magnetic field. The joint sensing system can also include a target disposed proximate to the electrical circuit, where the magnetic field induces a plurality of second currents to flow within the target of the enclosure. The joint sensing system can further include a sensor that measures the plurality of second currents flowing within the target to generate a plurality of measurements. The plurality of measurements can indicate a width of the flame path.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION

Figure 1A:
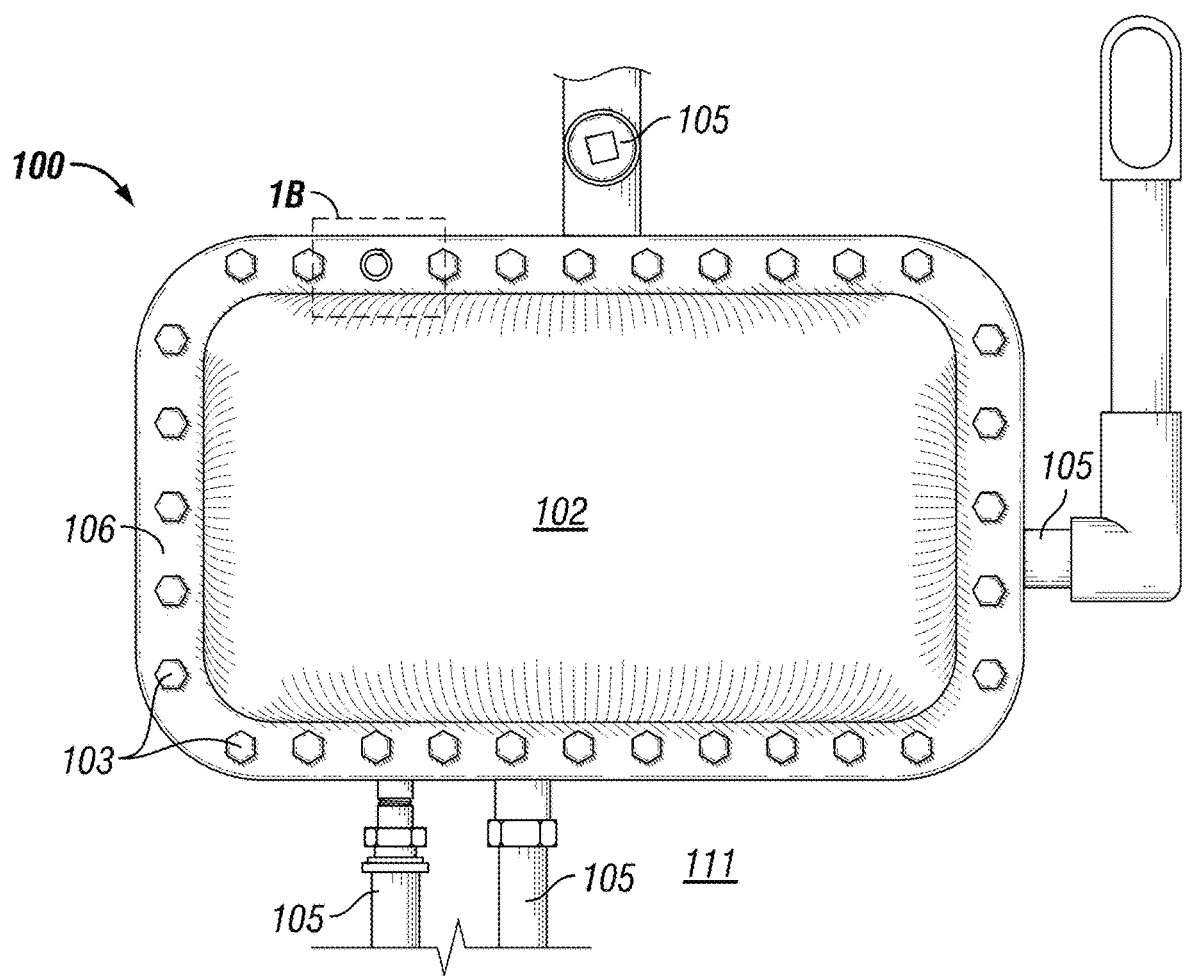
FIGS. 1A and 1B show a front view and a detailed view, respectively, of an explosion-proof enclosure in which one or more example embodiments can be implemented.

In general, example embodiments provide systems, methods, and devices for eddy current joint sensors. Example eddy current joint sensors can be used in any of a number of applications and with any of a number of types of enclosures. Examples of such applications can include, but are not limited to, industrial facilities, motor vehicles, buildings, shipping vessels, shipping containers, security systems, and aircraft. Examples of such enclosures can include, but are not limited to, electrical enclosures (e.g., junction boxes, conduit, control panels, motor housings), electrical devices (e.g., light fixture, switch), mechanical devices (relay contact, contactor), rooms (e.g., with windows, doors, vents), wheels, and any application where one components abuts against or proximate to another component.

In essence, example embodiments are intelligent proximity sensors, and so example embodiments can be used, at least, in a number of applications in which proximity sensors currently known in the art are used. Further, example eddy current joint sensors can be used in one or more of any of a number of environments, including but not limited to hazardous (e.g., explosive) environments, indoors, outdoors, cold temperatures, hot temperatures, high humidity, marine environments, hose-down environments, submersible environments, and low oxygen environments.

For example, in a marine environment, a gasket and/or other sealing device is disposed between an enclosure cover and an enclosure body to prevent water from entering the cavity of the enclosure. While no flame path (defined below) exists with such an enclosure compared to an explosion-proof enclosure, the joint must be sealed according to certain standards, just as the flame path (a type of joint) for an explosion-proof enclosure is subject to certain standards. Thus, for an enclosure in a marine environment, example embodiments can be used to determine and communicate the integrity of the joint between the enclosure cover and an enclosure body. The term eddy current point sensor, as used herein, can be interchanged with one or more other terms (e.g., eddy current flame path sensor), depending on the application in which example embodiments are being used.

While example embodiments are directed to flame paths for explosion-proof enclosures as described herein, the principals described herein can be used for monitoring a distance for any joint for any type of enclosure located in any type of environment. For instance, example embodiments can be used in an electrical enclosure that does not have a flame path but is used in a marine environment. In such a case, example embodiments can be used to determine the integrity of a seal between the cover and the body of the electrical enclosure and/or the condition of a proximity sensor. A user may be any person that interacts, directly or indirectly, with enclosures. Examples of a user may include, but are not limited to, an engineer, an electrician, an instrumentation and controls technician, a mechanic, an operator, a consultant, a contractor, and a manufacturer's representative.

In the foregoing figures showing example embodiments of eddy current joint sensors, one or more of the components shown may be omitted, repeated, and/or substituted. Accordingly, example embodiments of eddy current joint sensors should not be considered limited to the specific arrangements of components shown in any of the figures. For example, features shown in one or more figures or described with respect to one embodiment can be applied to another embodiment associated with a different figure or description.

In some cases, example eddy current joint sensors can be used in any of a number of enclosures. Examples of such enclosures can include electrical enclosures and mechanical enclosures. As defined herein a mechanical enclosure is any type of cabinet or housing inside of which is disposed one or more mechanical devices. A mechanical enclosure can also include one or more electrical devices. Examples of a mechanical enclosure can include, but are not limited to, a tool box, a gang box, a storage crate, and a shipping container. As used herein, a joint (also called a gap) is defined by two surfaces of an enclosure that abut against each other and/or are disposed in close proximity to each other.

Also, as defined herein, when an enclosure is an electrical enclosure, the electrical enclosure can be any type of cabinet or housing inside of which is disposed one or more electrical devices. An electrical enclosure can also include one or more mechanical devices. Such electrical and/or mechanical devices can include, but are not limited to, variable frequency drives (VFDs), controllers, relays (e.g., solid state, electro-mechanical), contactors, breakers, switches, transformers, inverters, converters, fuses, electrical cables, thermo-electric coolers (TECs), heating elements, air moving devices (e.g., fans, blowers), terminal blocks, wire nuts, and electrical conductors. In some cases, an electrical and/or mechanical device can generate heat when operating. Electrical devices can also include mechanical components and/or mechanical devices that are controlled by an electrical device. Examples of an electrical enclosure can include, but are not limited to, an electrical connector, a junction box, a motor control center, a breaker cabinet, an electrical housing, a conduit, a control panel, an electrical receptacle, a lighting panel, a lighting device, a relay cabinet, an indicating panel, and a control cabinet.

In certain example embodiments, enclosures in which example eddy current joint sensors are used are subject to meeting certain standards and/or requirements. For example, the National Electric Code (NEC), the National Electrical Manufacturers Association (NEMA), the International Electrotechnical Commission (IEC), and the Institute of Electrical and Electronics Engineers (IEEE) set standards as to electrical enclosures, wiring, and electrical connections. Use of example embodiments described herein meet (and/or allow a corresponding device and/or electrical enclosure to meet) such standards when required. In some (e.g., PV solar) applications, additional standards particular to that application may be met by the electrical enclosures in which example eddy current joint sensors are used.

In certain example embodiments, eddy current joint sensors can be used in spaces that are at least partially open (not fully enclosed). As discussed above, example embodiments can be used in hazardous environments or locations. Examples of a hazardous location in which example embodiments can be used can include, but are not limited to, an airplane hangar, a drilling rig (as for oil, gas, or water), a production rig (as for oil or gas), a refinery, a chemical plant, a power plant, a mining operation, and a steel mill. A hazardous environment can include an explosion-proof environment, which would require an electrical enclosure with an example eddy current joint sensor to meet one or more requirements, including but not limited to flame paths. Regardless of where and/or in what environments example embodiments are used, one or more components (e.g., inductor) of example eddy current joint sensors can be protected (e.g., hermetically sealed) since no electrical connections are required.

An electrical enclosure that includes an example eddy current joint sensor system can be located in any type of environment (e.g., indoors, outdoors, under water, in a climate controlled room). In addition, or in the alternative, example eddy current joint sensor systems can be located in hazardous and/or marine environments. As defined herein, a hazardous location is any location where the enclosure can be exposed to extreme conditions. Extreme conditions can include, but are not limited to, high temperatures, low temperatures, temperature fluctuations, corrosion, humidity, chemicals, vibrations, and dust. More information about hazardous locations and hazardous location enclosures can be found, for example, in Articles 500-506 and Articles 510-517 of the National Electric Code, which is incorporated herein by reference.

Examples of a hazardous location in which example embodiments can be used can include, but are not limited to, an airplane hangar, a drilling rig (as for oil, gas, or water), a production rig (as for oil or gas), a refinery, a chemical plant, a power plant, a mining operation, and a steel mill. A hazardous environment can include an explosion-proof environment, which would require an electrical enclosure with an example eddy current joint sensor system to meet one or more requirements, including but not limited to flame paths.

An explosion-proof enclosure is a type of hazardous location enclosure. In one or more example embodiments, an explosion-proof enclosure (also known as a flame-proof enclosure) is an enclosure that is configured to contain an explosion that originates inside the enclosure. Further, the explosion-proof enclosure is configured to allow gases from inside the enclosure to escape across joints of the enclosure and cool as the gases exit the explosion-proof enclosure. The joints are also known as flame paths and exist where two surfaces meet and provide a path, from inside the explosion-proof enclosure to outside the explosion-proof enclosure, along which one or more gases may travel. A joint may be a mating of any two or more surfaces. Each surface may be any type of surface, including but not limited to a flat surface, a threaded surface, and a serrated surface.

In one or more example embodiments, an explosion-proof enclosure is subject to meeting certain standards and/or requirements. For example, NEMA sets standards with which an electrical enclosure must comply in order to qualify as an explosion-proof enclosure. Specifically, NEMA Type 7, Type 8, Type 9, and Type 10 enclosures set standards with which an explosion-proof enclosure within certain hazardous locations must comply. For example, a NEMA Type 7 standard applies to electrical enclosures constructed for indoor use in certain hazardous locations. Hazardous locations may be defined by one or more of a number of authorities, including but not limited to the National Electric Code (e.g., Class 1, Division I) and UL (e.g., UL 1203). For example, a Class 1 hazardous area under the National Electric Code is an area in which flammable gases or vapors may be present in the air in sufficient quantities to be explosive.

As a specific example, NEMA standards for an explosion-proof enclosure of a certain size or range of sizes (e.g., greater than 100 in$^3$) may require that in a Group B, Division 1 area, any flame path of an explosion-proof enclosure must be at least 1 inch long (continuous and without interruption), and the gap between the surfaces cannot exceed 0.0015 inches. Standards created and maintained by NEMA may be found at www.nema.org/stds and are hereby incorporated by reference.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three or four digit number and corresponding components in other figures have the identical last two digits.

In addition, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of eddy current joint sensors will be described more fully hereinafter with reference to the accompanying drawings, in which example embodiments of eddy current joint sensors are shown. Eddy current joint sensors may, however, be embodied in many different forms and should not be construed as limited to the example embodiments set forth herein. Rather, these example embodiments are provided so that this disclosure will be thorough and complete, and will fully convey the scope of eddy current joint sensors to those of ordinary skill in the art. Like, but not necessarily the same, elements (also sometimes called components) in the various figures are denoted by like reference numerals for consistency.

Terms such as "first", "second", "top", "bottom", "side", "width", "length", "radius", "inner", and "outer" are used merely to distinguish one component (or part of a component or state of a component) from another. Such terms are not meant to denote a preference or a particular orientation, and are not meant to limit embodiments of eddy current joint sensors. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1B:
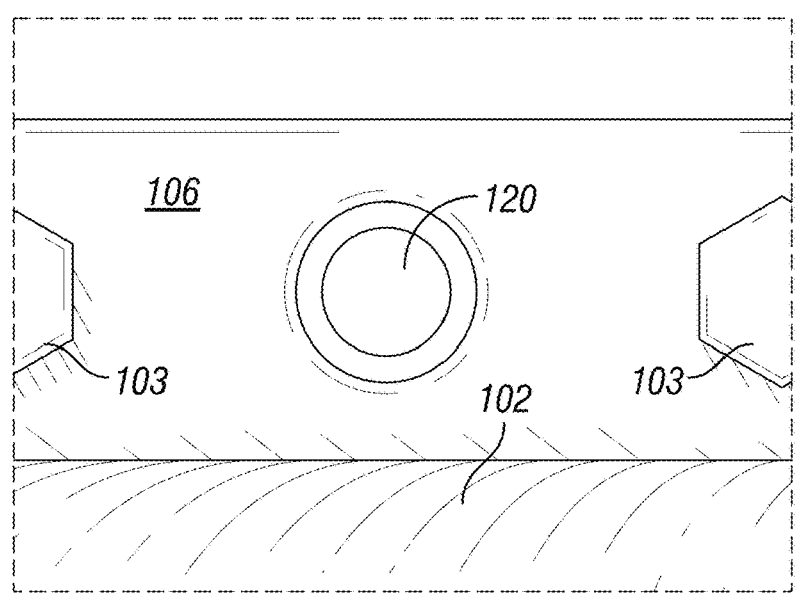

FIGS. 1A and 1B show a front view and a detailed view, respectively, of an explosion-proof enclosure 100 in which one or more example embodiments can be implemented. Referring now to FIGS. 1A and 1B, the enclosure 100 is in an closed position (i.e., the enclosure cover 102 is secured to the enclosure body (hidden from view)). The enclosure 100 is located in an ambient environment 111 (e.g., outdoors, a hazardous environment). The enclosure cover 102 can be secured to the enclosure body by a number of fastening devices 103 disposed within a number of apertures 120 around the perimeter of the enclosure engagement surface 106 (also called a flange 106 herein) of the enclosure cover 102 and around the perimeter of the enclosure engagement surface (also called a flange herein) of the enclosure body.

When the enclosure cover 102 and the enclosure body are in the closed position relative to each other, the enclosure engagement surface of the enclosure body abuts against the enclosure engagement surface 106 of the enclosure cover 102. When the enclosure 100 is an explosion-proof enclosure, as in this case, a flame path is formed between the enclosure engagement surface of the enclosure body and the enclosure engagement surface 106 of the enclosure cover 102. The enclosure body forms a cavity inside of which one or more components are disposed. When the enclosure cover 102 and the enclosure body are in the closed position relative to each other, then the cavity is substantially enclosed.

A fastening device 120 may be one or more of a number of fastening devices, including but not limited to a bolt (which may be coupled with a nut), a screw (which may be coupled with a nut), and a clamp. In addition, one or more optional hinges (not shown) can be secured to one side of the enclosure cover 102 and a corresponding side of the enclosure body so that, when all of the fastening devices 103 are removed, the enclosure cover 102 may swing outward (i.e., an open position) from the enclosure body using the one or more hinges. In one or more example embodiments, as in the enclosure 100 of FIGS. 1A and 1B, there are no hinges, and the enclosure cover 102 can be completely separated from the enclosure body when all of the fastening devices are removed.

The enclosure cover 102 and the enclosure body may be made of any suitable material, including metal (e.g., alloy, stainless steel), plastic, some other material, or any combination thereof. The enclosure cover 102 and the enclosure body may be made of the same material or different materials. In one or more example embodiments, on the end of the enclosure body opposite the enclosure cover 102, one or more mounting brackets (hidden from view) are affixed to the exterior of the enclosure body to facilitate mounting the enclosure 100. Using the mounting brackets, the enclosure 100 may be mounted to one or more of a number of surfaces and/or elements, including but not limited to a wall, a control cabinet, a cement block, an I-beam, and a U-bracket.

There can be one or more conduits 105 that are coupled to a wall of the enclosure body of the enclosure 100. Each conduit 105 can have one or more electrical conductors (e.g., electrical cables) disposed therein, where one end of the electrical conductors (also called electrical cables) are electrically coupled to one or more devices (e.g., electrical device, mechanical device) disposed within the enclosure 100.

In order to maintain a suitable flame path between the flange 106 of the enclosure cover 102 and the flange of the enclosure body, all of the fastening devices 103 must be properly engineered, machined, applied and tightened within all of the apertures 120. If one or more of the fastening devices 103 is missing, as shown in FIGS. 1A and 1B, and/or if one or more of the fastening devices 103 is not tightened properly (e.g., is tightened to the proper torque), then the flame path may not be compliant with applicable safety standards. As illustrated below with respect to FIG. 2, this can lead to catastrophic results.

As a result of the environment (e.g., high vibrations, humidity, extreme temperature swings, corrosiveness) that an explosion-proof enclosure can be exposed, one or more fastening devices 103 can loosen and/or corrode. Similarly, one or more of the apertures 120 can experience corrosion and/or other adverse conditions. Consequently, the flame paths of an explosion-proof enclosure 100 can transform from being proper upon installation to falling out of compliance with applicable standards. Many enclosures are opened or otherwise inspected on a very infrequent basis, and so a user would often not know when the flame paths were not proper. In some cases, when the explosion-proof enclosure 100 is closed, the fastening devices 103 are not properly torqued, which means that the width of the flame path is improper once the enclosure 100 is put back into service.

Even when an explosion-proof enclosure is located in a location with relatively benign conditions, a user may not apply the proper amount of torque when tightening the fastening devices 103 within the apertures 120. When this occurs, the flame path will be improper for the explosion-proof enclosure, presenting a severe safety hazard. In any of these cases, example embodiments can notify a user that a flame path of an explosion-proof enclosure is not within an acceptable range. Example embodiments are designed to be a safe and reliable system for notifying a user when a flame path within an explosion-proof enclosure is not within acceptable limits.

Figure 2:
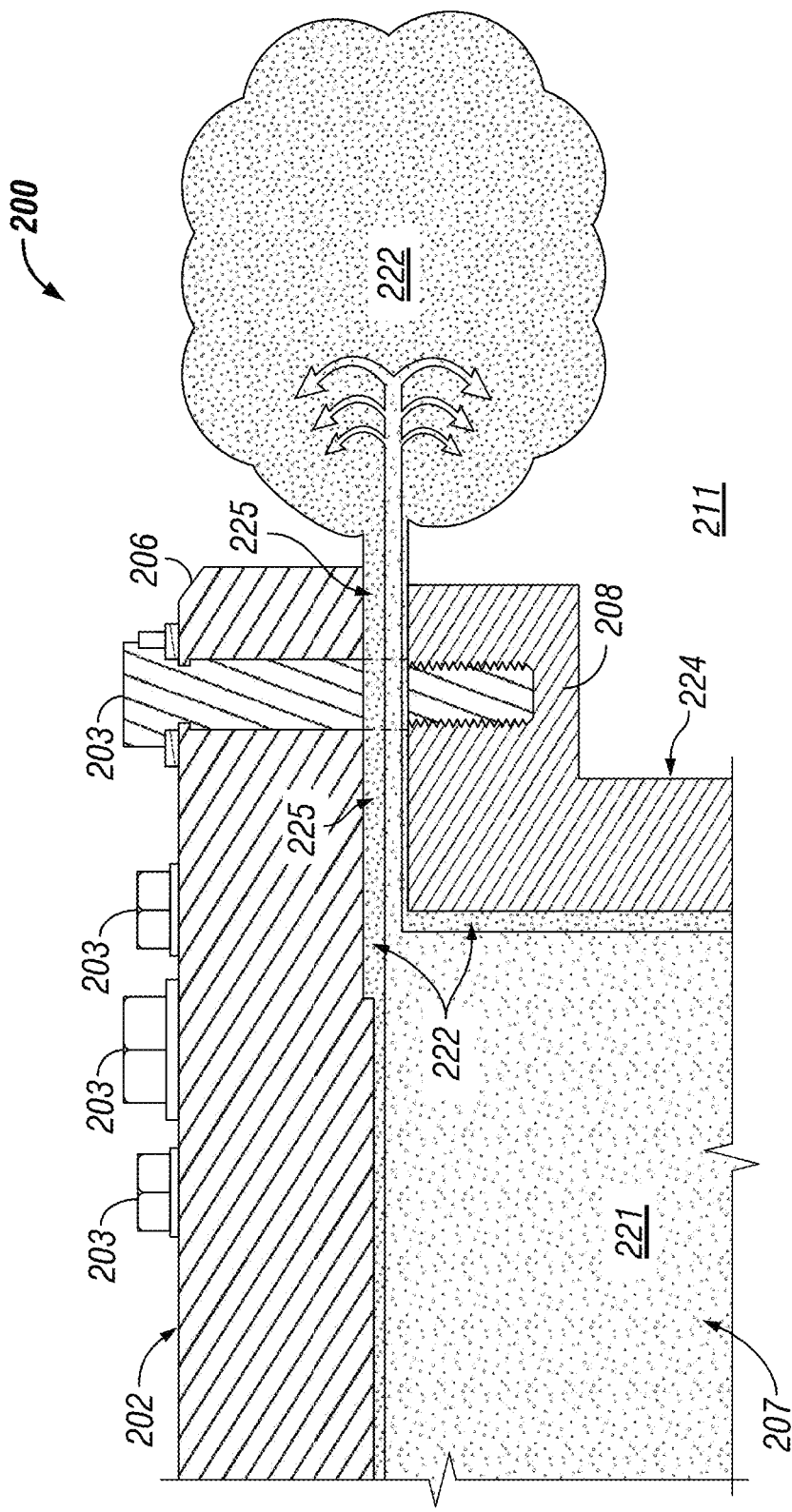
FIG. 2 shows a cross-sectional side view of a flame path for an explosion-proof enclosure for which one or more example embodiments can be implemented.

FIG. 2 shows a cross-sectional side view of a flame path 225 for an explosion-proof enclosure 200 for which one or more example embodiments can be implemented. The components of the explosion-proof enclosure 200 in FIG. 2 are substantially the same as the corresponding components of the explosion-proof enclosure 100 in FIGS. 1A and 1B. In this case, the enclosure body 224 and the flange 208 of the explosion-proof enclosure 200 are visible, as is the cavity 207 defined by the enclosure body 224 and the enclosure cover 202.

When an explosion occurs within the cavity 207, at least some of the gas (in this case, the burned gas 221) disposed within the cavity 207 at the time of the explosion combusts within the cavity 207. In order to prevent excessive pressure from building within the cavity 207, causing the explosion-proof enclosure 200 to explode, the flame path 225 must be wide enough to allow the unburned gas 222 to escape. As stated above, the explosion-proof enclosure 200 is designed to allow gases (in this case, the unburned gas 222) from within the cavity 207 of the explosion-proof enclosure 200 to escape across the flame path 225 to the ambient environment. As this occurs, the unburned gas 222 exits the explosion-proof enclosure 200 through the flame path 225, the unburned gas 222 cools. In this case, the flame path 225 is formed by the flange 206 of the enclosure cover 202 and the flange 208 of the enclosure body 224.

Figure 9:
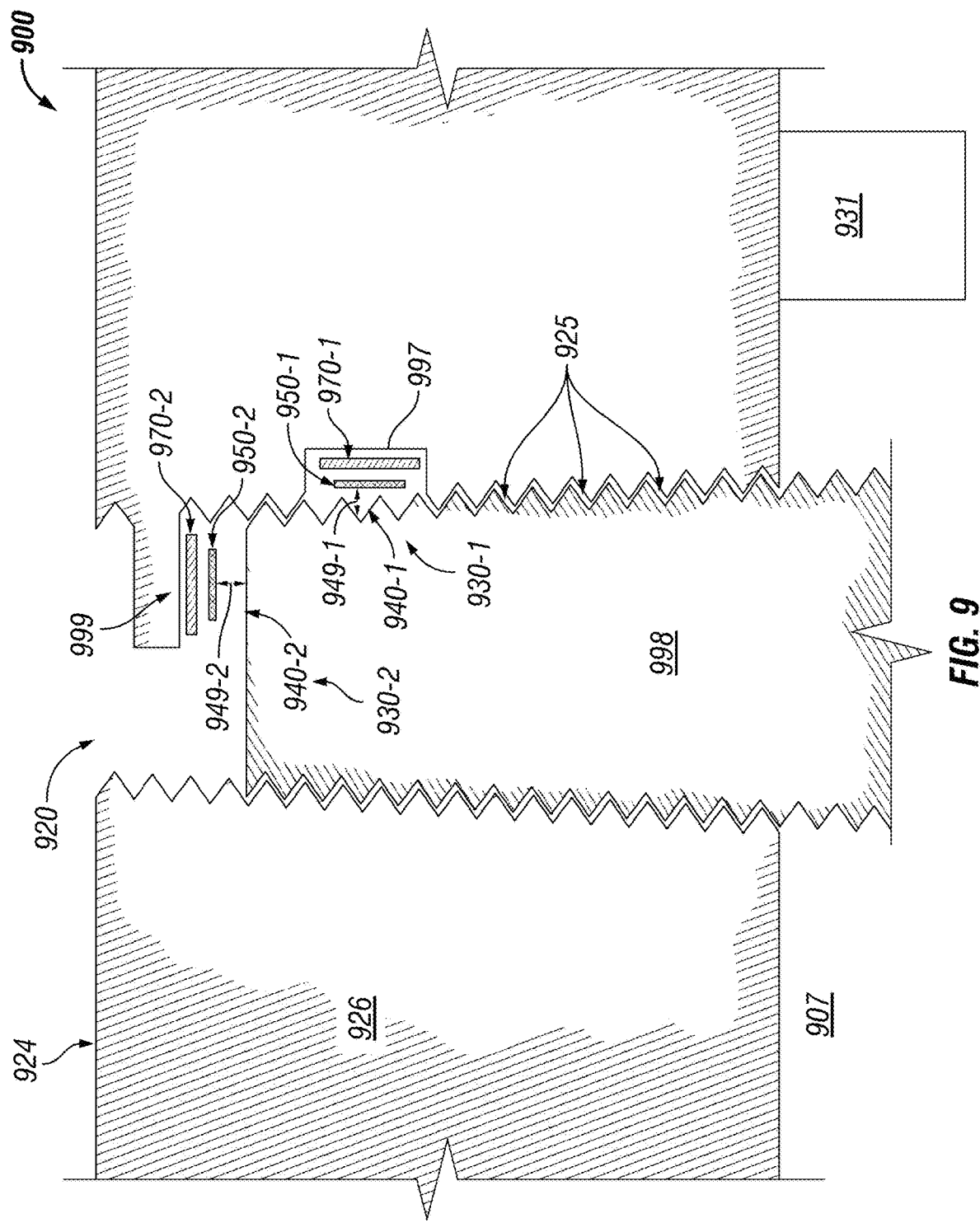
Figure 10:
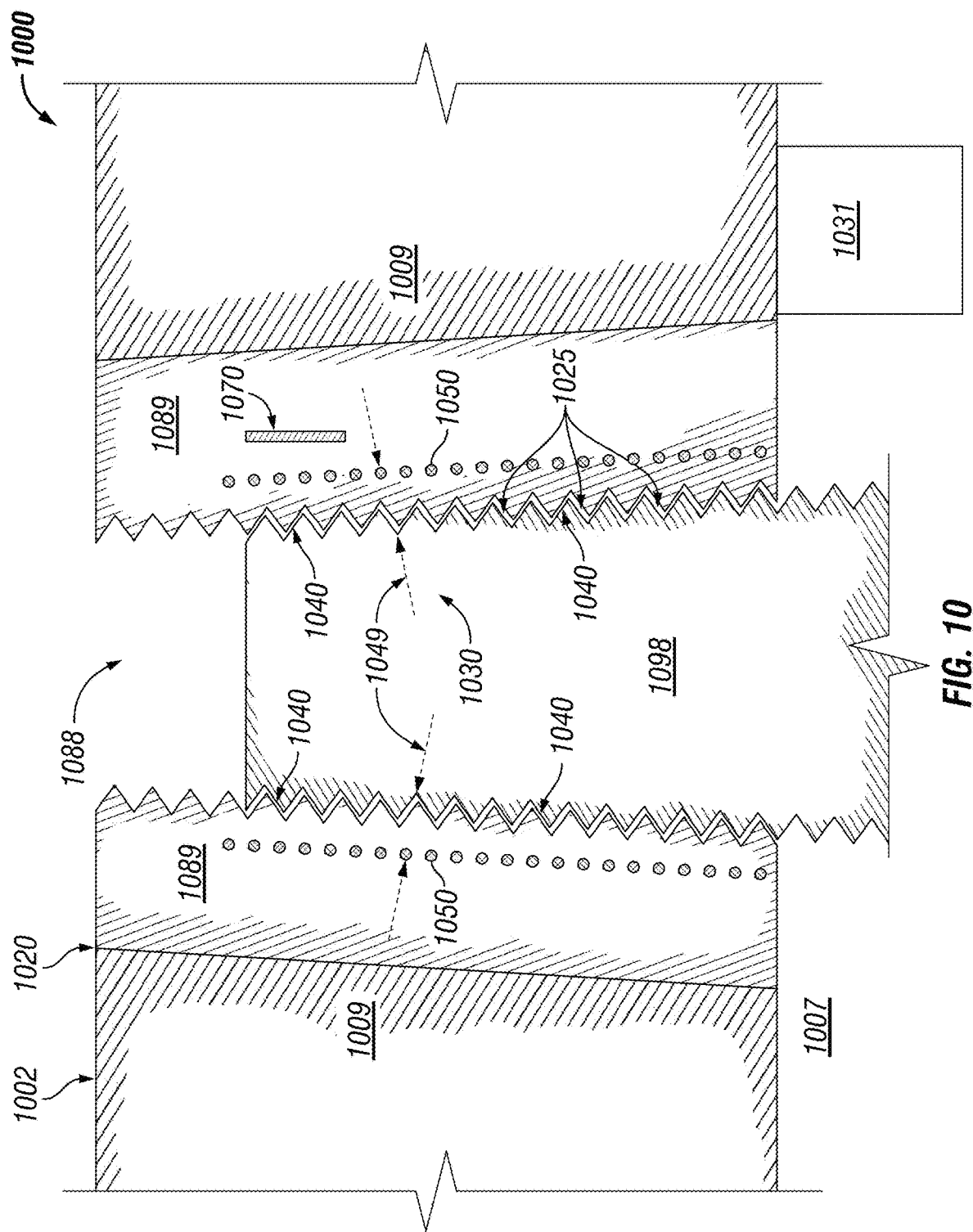

In this example of FIG. 2, the joint 225 (e.g., the flame path 225) is where the enclosure cover 202 and the enclosure body 244 meet. Those of ordinary skill in the art will appreciate that one or more joints can exist, additionally or alternatively, at other locations of an electrical enclosure. For example, as shown in FIGS. 9 and 10 below, a joint can exist where an aperture traverses a wall of an enclosure body and/or a wall of an enclosure cover. An aperture in the wall of an electrical enclosure can exist for any of a number of purposes, including but not limited to accommodation for a switch, accommodation for an indicating light, accommodation for a conduit, accommodation for a filter, and accommodation for a control panel.

Figure 3:
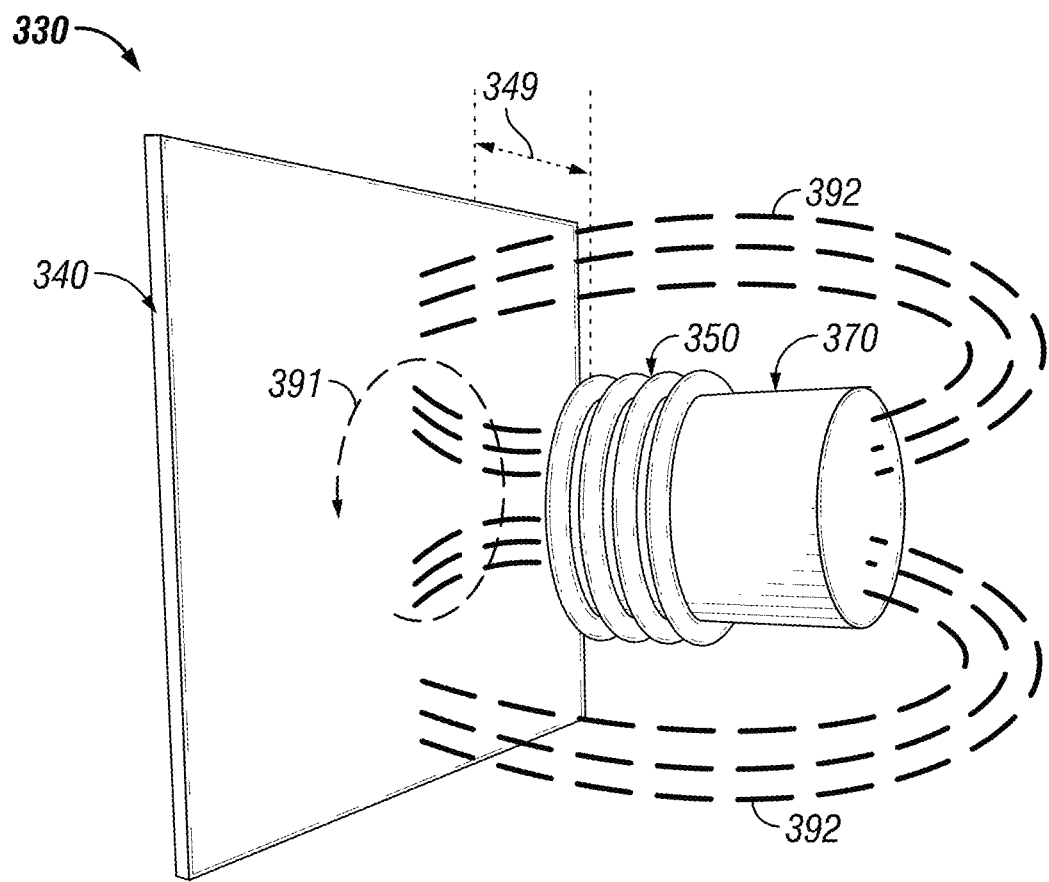
FIG. 3 shows an example of how an example eddy current joint sensor works.

FIG. 3 is a diagram showing how an example eddy current joint (e.g., flame path) sensor system 330 works. The eddy current flame path sensor system 330 of FIG. 3 includes an electrical circuit 350, a target 340 (also sometimes called a loop coupon 340 herein), and a sensor 370. Referring to FIGS. 1A-3, eddy current sensors operate using magnetic fields 392. A source of power (not shown) causes a current to flow through an electrical circuit 350. Usually, the current is alternating current (AC). When alternating current is used, any of a number of frequencies (e.g., 12.5 kHz) can be used to induce eddy currents 391 of known characteristics (e.g., level, frequency).

When the current flows through the electrical circuit 350, a magnetic field 392 results. The electrical circuit 350 is disposed proximate to a target 340 (e.g., a portion of the flange 208 of the enclosure body 224, a portion of the flange 206 of the enclosure cover 202) so that when the current flows through the electrical circuit 350, small currents 391 (sometimes called eddy currents 391) are induced in the target 340 by the magnetic field 392. In this way, the target 340 is made of an electrically conductive material. The eddy currents 391 create a magnetic field that opposes and resists the magnetic field 392 generated by the current flowing through the electric circuit 350.

The strength of the magnetic field generated by the eddy currents 391 combined with the magnetic field 392 generated by the current flowing through the electric circuit 350 can be measured by the sensor 370. The interaction of the magnetic field generated by the eddy currents 391 and the magnetic field 392 generated by the current flowing through the electric circuit 350 is dependent on the distance 349 between the electrical circuit 350 and the target 340.

Consequently, as the distance 349 between the electrical circuit 350 and the target 340 changes, the magnitude measured by the sensor 370 changes. In this way, if the target 340 is a part of the explosion-proof enclosure that defines a flame path, then a change in the reading of the sensor 370 means that the distance 349 between the electrical circuit 350 and the target 340 (and so the width of the flame path) has also changed. Test history, algorithms, and/or other information can allow a user to determine, with some degree of certainty, whether a flame path is within acceptable limits as the readings of the sensor 370 change.

Figure 4:
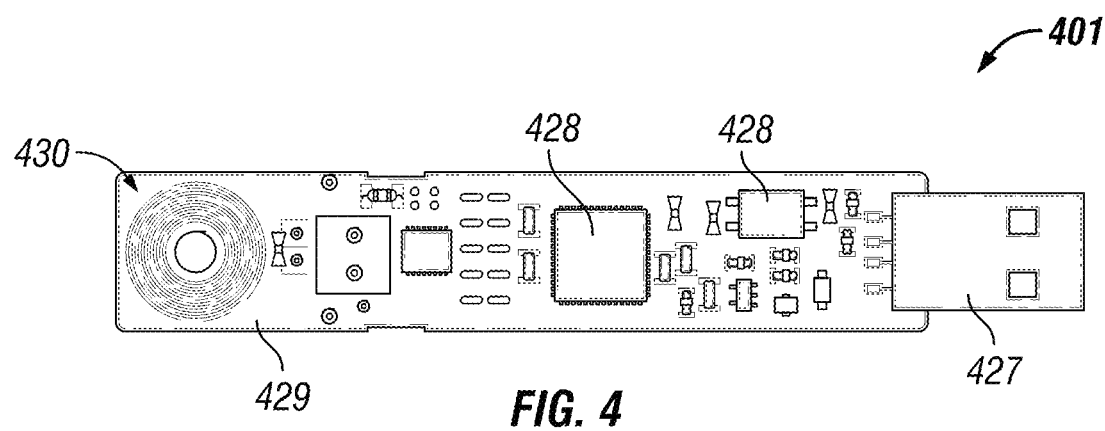
FIG. 4 shows a circuit module that includes at least a portion of a flame path sensing system in accordance with certain example embodiments.

FIG. 4 shows a circuit module 401 that includes at least a portion of a flame path sensing system in accordance with certain example embodiments. Referring to FIGS. 1A-4, the circuit module 401 of FIG. 4 includes a connector 427 disposed at one end that connects to some other component (e.g., a power source, another circuit module) within the cavity 207 of an enclosure 200. Disposed on the circuit board 429 of the circuit module 401 include a number of integrated circuits 428 and at least part of a flame path sensing system 430.

Figure 5A:
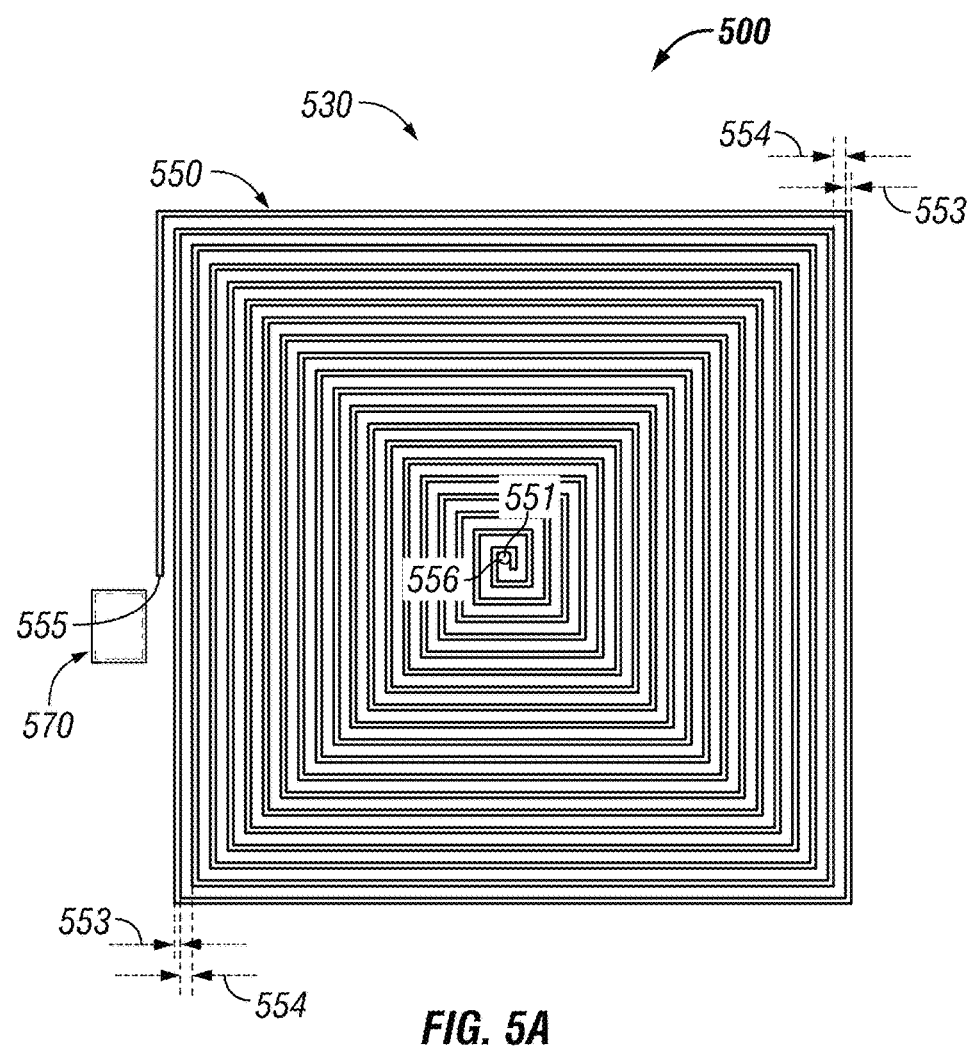
FIGS. 5A and 5B show a top view and a side view, respectively, of a flame path sensing system in accordance with certain example embodiments.
Figure 5B:
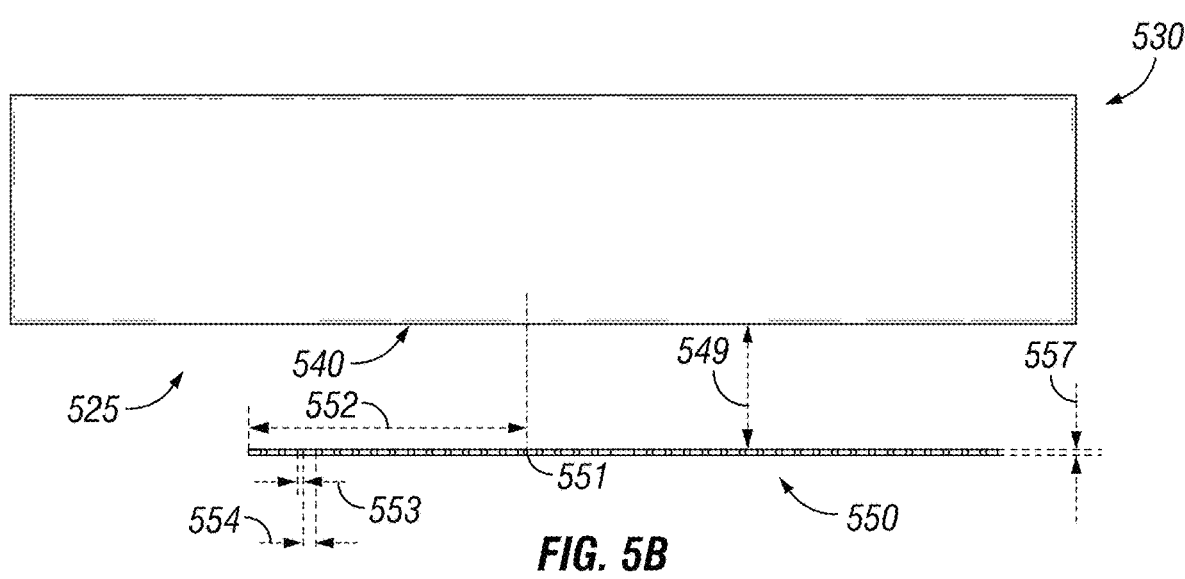

FIGS. 5A and 5B show a top view and a side view, respectively, of a flame path sensing system 530 in accordance with certain example embodiments. Referring to FIGS. 1-5B, the flame path sensing system 330 of FIGS. 5A and 5B can include a target 540, an electrical circuit 550, and a sensor 570. In certain example embodiments, the target 540 is part of the explosion-proof enclosure that forms a flame path 525. For example, the target 540 can be part of the flange of the enclosure body. As another example, the target 540 can be part of the flange of the enclosure cover. The target 540 can be made of one or more electrically-conductive materials.

As discussed above, in certain example embodiments, the electrical circuit 550 (also sometimes called an inductor 550) is a component that generates a magnetic field (e.g., magnetic field 392) when electric current flows therethrough. The magnetic field generated by the electrical circuit 550 can induce eddy currents (e.g., eddy current 391) to flow within the target 540 when the electrical circuit 550 and the target 540 are placed some nominal distance 549 from each other. The electrical circuit 550 can have a spiral-wound shape when viewed from above, as shown in FIG. 5A. Examples of a closed shape formed by the electrical circuit 550 can include, but is not limited to, a circle, an oval, a square (as shown), a hexagon, a triangle, a rectangle, and a random shape. The electrical circuit 550 can have a first end 555 and a second end 556 that are not directly coupled to each other. In its spiral-wound shape, the electrical circuit 550 can be separated from itself by a distance 554, which can be substantially the same and/or variable along its length. A power source (not shown) can be electrically coupled to the first end 555 and/or the second end 556 to flow electric current through the electrical circuit 550, thereby allowing the magnetic field to be emitted by the electrical circuit 550.

The electrical circuit 550 can have a height 557 and a width 553. The height 557 and/or the width 553 can be substantially uniform throughout. Alternatively, the height 557 and/or the width 553 can vary along the length of the electrical circuit 550. In any case, all of the particular characteristics (e.g., the composition, the shape, the height 557, the width 553, the radius 552, the perimeter, the approximate center 551 (when viewed from above)) of the electrical circuit 550 are known. In some cases, the electrical circuit 550 can be coated, sealed, and/or otherwise treated so that corrosion or other form of deterioration of the materials that make up the electrical circuit 550 does not occur or occurs minimally over time. In other words, example embodiments can require that the electrical circuit 550 delivers the magnetic field on a substantially consistent basis over time. In some cases, there can be more than one electrical circuit 550 for a flame path sensing system 330.

In certain example embodiments, the electrical circuit 550 and the target 340 have any of a number of orientations relative to each other. For example, the electrical circuit 550 and the target 540 can be substantially parallel to each other, as shown in FIG. 5B. As another example, as stated above, the electrical circuit 550 and the target 540 can be separated from each other by a distance 549 (as shown in FIG. 5B) that allows eddy currents to flow in the target 540, where the eddy currents are induced by the magnetic field generated by the electrical circuit 550. The width of the electrical circuit 550 can be defined by a radius 552.

In certain example embodiments, the sensor 570 of the flame path sensing system 530 measures the net magnitude of the magnetic fields generated by the eddy currents flowing through the target 540 and by the current flowing through the electrical circuit 550. As stated above, the net magnitude of the magnetic fields is dependent on the distance 549 between the target 540 and the electrical circuit 550. As the distance 549 increases, the amount of eddy current flowing through the target 540 decreases, which increases the net magnitude of the magnetic fields measured by the sensor 570. The sensor 570 can be part of the electrical circuit 550. Alternatively, the sensor 570 can be a separate component relative to the electrical circuit 550.

In some cases, the sensor 570 can be coupled to one or more other components. For example, the sensor 570 can be coupled to an indicating light. In such a case, the sensor 570 can illuminate the indicating light to indicate, in real time, when the width of a flame path (or, more generally, the gap between the surfaces of) in the explosion-proof enclosure falls outside the required limits. As another example, the sensor 570 can be coupled to a controller. In such a case, the controller can actively monitor and analyze the width of the flame path in the explosion-proof enclosure. The controller can take an active role in managing the integrity and maintenance of the explosion-proof enclosure, as well as other related equipment. An example of a controller is described below in FIG. 11.

Eventually, the flame path 525 (or, more specifically, the width of the flame path 525) formed by the target 540 can eventually fall outside of acceptable limits. For instance, the flame path 525 can become too narrow to be safely utilized. Alternatively, the flame path 525 can become too large to be safely utilized. By using example flame path sensing systems 530, a user can determine whether the flame path 525 is within acceptable limits, whether the flame path 525 is approaching an acceptable limit, the width of the flame path 525 at a point in time, and/or any other relevant information with respect to the flame path 525, as measured by the sensor 570. Knowledge of any of a number of factors, including but not limited to the distance 549 between the target 540 and the electrical circuit 550, the initial width of the flame path 525, the radius 542 of the electrical circuit 550, the amount of current flowing through the electrical circuit 550, and the material of the target 540, can help a user better determine the width of the flame path 525 occurring in the area proximate to the flame path sensing system 530.

Figure 6:
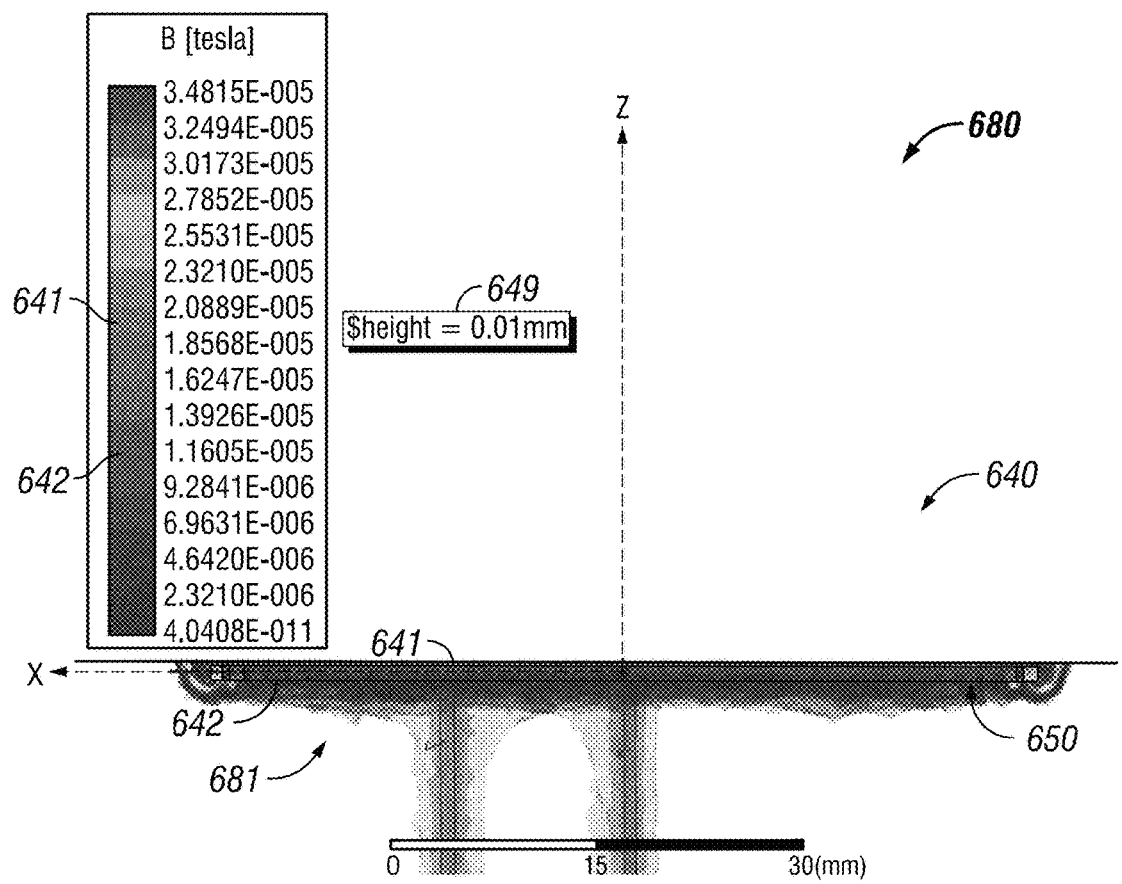
FIG. 6 shows a graph of a magnetic field generated by eddy current induced in a target in accordance with certain example embodiments.

FIG. 6 shows a graph 680 of a magnetic field 681 generated by eddy current induced in a target 640 in accordance with certain example embodiments. Specifically, referring to FIGS. 1-6, the graph 680 of FIG. 6 shows the strength of the magnetic field 681 emitted by a combination of the target 640 and the electrical circuit 650, which are separated from each other by a distance 649 of 0.01 mm. Generally, the strength of the magnetic field 681 decreases as the distance from the target 640 and electrical circuit 650 increases. For example, the magnetic field 681 has a strength 641 of approximately $2 \times 10^{-5}$ T close to the electrical circuit 650, and the strength 642 of the magnetic field 641 decreases to approximately $9 \times 10^{-6}$ T further away from the electrical circuit 650.

Figure 7:
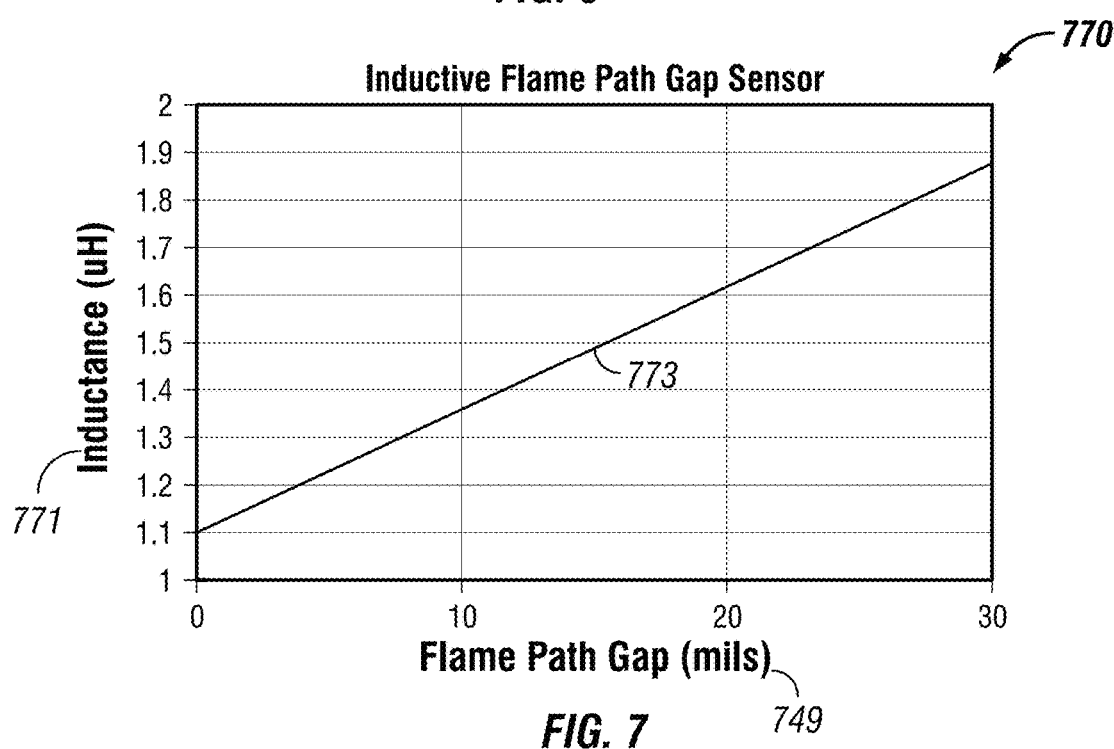
FIG. 7 shows a graph of the relationship between the width of the flame path formed by the target and an amount of measured inductance in accordance with certain example embodiments.

FIG. 7 shows a graph 770 of the relationship between the width 749 of the flame path (which directly correlates to or is equal to the distance 749 between the target (e.g., target 540) and the electrical circuit (e.g., electrical circuit 550)) formed by the target and an amount of measured inductance 771 in the target in accordance with certain example embodiments. The curve 773 of the graph 770 shows that the inductance 771 in the target (e.g., target 540) is lowest (in this case, approximately 1.1 µH) when the width 749 of the flame path 525 is smallest (in this case, slightly less than one mil).

As the width 749 of the flame path 525 becomes greater, the inductance 771 in the target increases in a substantially linear relationship. For example, when the width 749 of the flame path 525 is approximately 30 mils, the inductance 771 in the target is approximately 1.88 µH. As another example, when the width 749 of the flame path 525 is approximately 20 mils, the inductance 771 in the target is approximately 1.63 µH. As yet another example, when the width 749 of the flame path 525 is approximately 10 mils, the inductance 771 in the target is approximately 1.38 µH.

Figure 8:
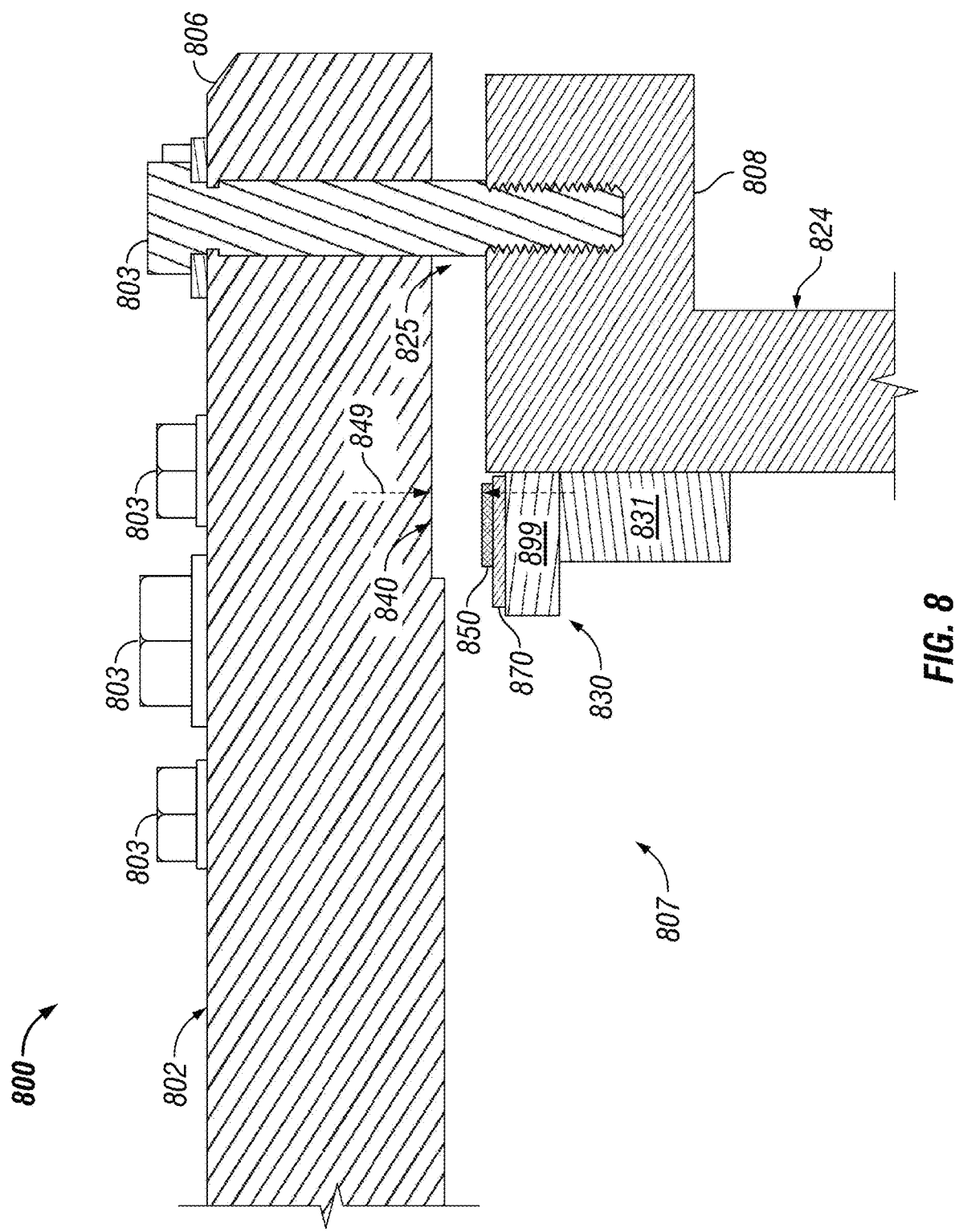
FIGS. 8-10 each show a cross-sectional side view of a flame path sensing system disposed in an explosion-proof enclosure in accordance with certain example embodiments.

FIGS. 8-10 each show a cross-sectional side view of a flame path sensing system disposed in an explosion-proof enclosure in accordance with certain example embodiments. Referring to FIGS. 1A-10, the flame path sensing system 830 disposed within the cavity 807 of the explosion-proof enclosure 800 of FIG. 8 includes a target 840, an electrical circuit 850, a sensor 870, an optional controller 831, and a mounting platform 899. In this case, the target 840 is a portion of the inner surface of the enclosure cover 802 adjacent to the flange 806 of the enclosure cover 802. In other words, the target 840 is located at the beginning of the flame path 825.

The mounting platform 899 is disposed on the inner surface of the enclosure body 824 toward the top end of the enclosure body 824 and adjacent to the flange 808 of the enclosure body 824. The sensor 870 and the electrical circuit 850 are disposed on a top side of the mounting platform 899, and the controller 831 is mounted on a bottom side of the mounting platform 899. As in this case, the location of the mounting platform 899 can be such that the electrical circuit 850 is located a distance 849 from the target 840. The distance 849 can be substantially the same as the width of the flame path 825. The mounting platform 899 can be a separate piece that is coupled to the enclosure body 824. Alternatively, the mounting platform 899 and the enclosure body 824 can form a single piece. The controller 831 can be coupled to the sensor 870 and the electrical circuit 850. As explained above, more details of the controller 831 are provided below with respect to FIG. 11.

With the explosion-proof enclosure 900 of FIG. 9, the flame path 925 is formed between an aperture 920 that traverses a wall 926 of the enclosure body 924 and a plug 998 disposed in the aperture 920. The plug 998 and the enclosure body 924 that forms the aperture 920 have mating threads (or some other coupling features) that complement each other, and so the plug 998 is disposed in the aperture 920 using the mating threads.

There are two flame path sensing systems 930 (flame path sensor system 930-1 and flame path sensor system 930-2) in FIG. 9. Flame path sensor system 930-1 includes a target 940-1, an electrical circuit 950-1, and a sensor 970-1. In this case, the target 940-1 is a portion of the outer side surface of the plug 998 that forms part of the flame path 925. Common between both flame path sensor systems 930 is an optional controller 931. There is no mounting platform included in the flame path sensor system 930-1. Instead, the sensor 970-1 and the electrical circuit 950-1 are disposed within a recess 997 in part of the enclosure body 924 that forms the aperture 920. The recess 997 is disposed in a part of the enclosure body 824 that is adjacent to the plug 998. As in this case, the location and depth of the recess 997 can be such that the electrical circuit 950-1 is located a distance 949-1 from the target 940-1. The distance 949-1 can be substantially the same as the width of the flame path 925 at that part along the length of the flame path 925.

Flame path sensor system 930-2 includes a target 940-2, an electrical circuit 950-2, a sensor 970-2, and a mounting platform 999. In this case, the target 940-2 is a portion of the outer top surface of the plug 998 that is adjacent to an end of the flame path 925. The mounting platform 999 is disposed on the inner surface of a part of the enclosure body 924 that forms the aperture 920. The mounting platform extends into the aperture 920. The sensor 970-2 and the electrical circuit 950-2 are disposed on the mounting platform 999. As in this case, the location of the mounting platform 999 can be such that the electrical circuit 950-2 is located a distance 949-2 from the target 940-2. The distance 949-2 can somehow be correlated to the width of the flame path 925.

In this case, the optional controller 931 is disposed within the cavity 907 of the electrical enclosure 900. Specifically, as shown in FIG. 9, the controller 931 is affixed to an inner surface of the wall 926 of the enclosure body 924, adjacent to the aperture 920 and the plug 998. The controller 931 can be coupled to both sensors 970 and both electrical circuits 950. As explained above, more details of the controller 931 are provided below with respect to FIG. 11.

With the explosion-proof enclosure 1000 of FIG. 10, the flame path 1025 is formed between a sleeve 1089 and a plug 1098 disposed in an aperture 1088 that traverses the height of the sleeve 1089. The sleeve 1089 is disposed within an aperture 1020 that traverses a wall 1009 of the enclosure cover 1002. The outer surface of the plug 1098 and the inner surface of the sleeve 1089 can have mating threads (or some other coupling features) that complement each other, and so the plug 1098 is disposed in the aperture 1088 of the sleeve 1089 using the mating threads. The sleeve 1089 can be made of any of a number of materials. For example, the sleeve 1089 can be made of a polymeric material that is thermally and/or electrically non-conductive.

The flame path sensing system 1030 of the explosion-proof enclosure 1000 of FIG. 10 can include a target 1040, an electrical circuit 1050, an optional controller 1031, and a sensor 1070. In this case, the target 1040 is a portion of the outer surface of the plug 1098 that forms part of the flame path 1025. The flame path 1025 is formed between the aperture 1088 that traverses the sleeve 1089 and the plug 1098. In this case, the electrical circuit 1050 is wound spirally (e.g., continually, in multiples of segments) within the sleeve 1089 along at least some of the height of the sleeve 1089 adjacent to the inner surface of the sleeve 1089 that forms the aperture 1088. In this way, the target 1040 can be most, if not all, of the outer surface of the plug 1098 that is disposed within the aperture 1088.

The width of the flame path 1025 can be substantially the same as (or at least proportional to) the distance 1049. The sensor 1070 can also be embedded within the sleeve 1089. In certain example embodiments, the sensor 1070 can simultaneously make multiple measurements at one time. Alternatively, the sensor 1070 can make a single measurement at any point in time. In this case, the optional controller 1031 is disposed within the cavity 1007 of the electrical enclosure 1000. Specifically, as shown in FIG. 10, the controller 1031 is affixed to an inner surface of the wall 1009 of the enclosure cover 1002, adjacent to the aperture 1020 and the plug 1098. The controller 1031 can be coupled to the sensor 1070 and the electrical circuit 1050. As explained above, more details of the controller 1031 are provided below with respect to FIG. 11.

Figure 11:
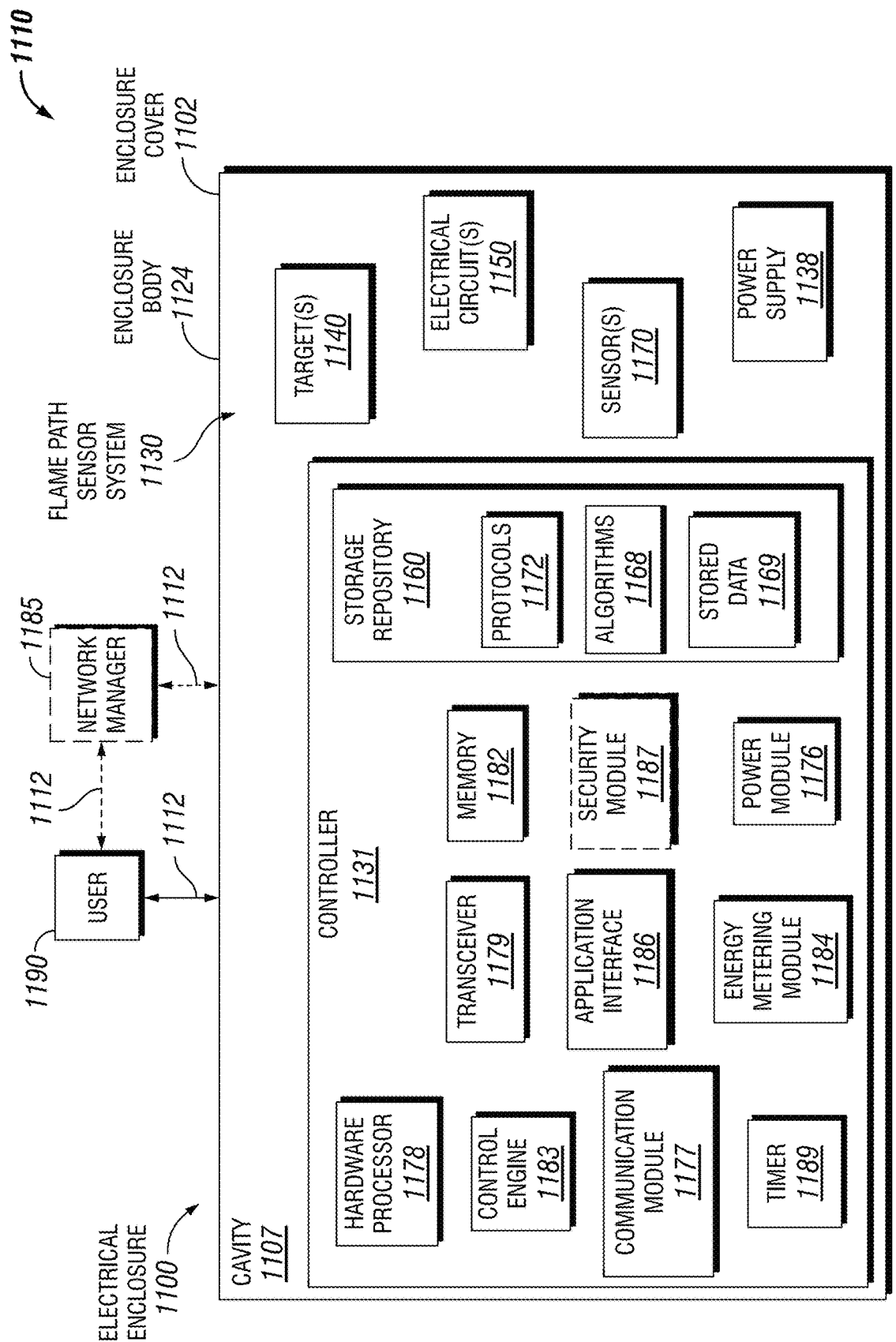
FIG. 11 shows a diagram for a system that includes a controller in accordance with certain example embodiments.

FIG. 11 shows a diagram of a system 1110 that includes a controller 1131 in accordance with certain example embodiments. Referring to FIGS. 1-11, in addition to the electrical enclosure 1100, the system 1110 of FIG. 11 can include a user 1190 and an optional network manager 1185. The electrical enclosure 1100 can include a power supply 1138, and a flame path sensor system 1130. The flame path sensor system 1130 can include, for example, the controller 1131, one or more targets 1140, one or more electrical circuits 1150, and one or more sensors 1170. The controller 1131 can include one or more of a number of components. Such components, can include, but are not limited to, a control engine 1183, a communication module 1177, a timer 1189, a power module 1176, an energy metering module 1184 (also called, more simply, a metering module 1184 herein), a storage repository 1160, a hardware processor 1178, a memory 1182, a transceiver 1179, an application interface 1186, and, optionally, a security module 1187. The components shown in FIG. 11 are not exhaustive, and in some embodiments, one or more of the components shown in FIG. 11 may not be included in an example electrical enclosure 1100. Any component of the example electrical enclosure 1100 can be discrete or combined with one or more other components of the electrical enclosure 1100.

While FIG. 11 includes an electrical enclosure 1100, any other type of enclosure can be used in the system 1110 of FIG. 11. Examples of other types of enclosures can include, but are not limited to, an airplane, a wheel, a room, a container, a drawer, a building, and a pressure vessel.

The user 1190 is the same as a user defined above. The user 1190 interacts with (e.g., sends instructions to, sends settings to, receives data from) the electrical enclosure 1100 (including any portions thereof, such as the controller 1131, the sensors 1170) via the application interface 1186 and one or more communication links 1112 (described below). The user 1190 can also interact with a network manager 1185. Interaction between the user 1190 and the electrical enclosure 1100 and/or the network manager 1185 can be conducted using communication links 1112. The communication links 1112 can transmit signals (e.g., electrical power, communication signals, control signals, data) between the electrical enclosure 1100, the user 1190, and the network manager 1185.

The network manager 1185 is a device or component that can communicate with the controller 1131. For example, the network manager 1185 can send instructions to the controller 1131 of the electrical enclosure 1100 as to when current should be sent through the target 1140. As another example, the network manager 1185 can receive data associated with the operation of the flame path sensor system 1130 of the electrical enclosure 1100. Such data can be used for any of a number of purposes, such as determining when maintenance should be performed on the flame path sensor system 1130 (or portions thereof), the power supply 1138, and/or some other component within the cavity 1107 formed by the enclosure body 1124 and/or the enclosure cover 1002 of the electrical enclosure 1100.

The electrical enclosure 1100 can use one or more of a number of communication protocols (a type of protocol 1172). The electrical enclosure 1100 can include and/or be coupled to one or more sensors 1170. A sensor 1170 can be substantially similar to a sensor described above. These sensors 1170 can measure one or more parameters in and/or around the electrical enclosure 1100. Examples of such parameters can include, but are not limited to, current, temperature, and relative humidity. For example, a sensor 1170 can measure an amount of eddy current flowing through an electrical circuit 1150. In some cases, a sensor 1170 can send a parameter (for example, to the controller 1131) in addition to measuring a parameter.

The sensors 1170, the electrical circuits 1150, and the targets 1140 of FIG. 11 can be substantially the same as the sensors, the electrical circuits, and the targets described above. The power supply 1138 of the electrical enclosure 1100 can send power, control, and/or communication signals to the controller 1131, the sensors 1170, and/or the targets 1140. The power supply 1138 can include one or more components. Examples of components of a power supply 1138 can include, but are not limited to, a transformer, a generator, a battery, an electrical receptacle, an electrical cable, an electrical conductor, a fuse, a breaker, and an inductor. Power delivered by the power supply 1138 can be done using wired and/or wireless technology.

The power supply 1138 can be a source of independent power generation. For example, the power supply 1138 can include an energy storage device (e.g., a battery, a supercapacitor). As another example, the power supply 1138 can include photovoltaic solar panels. In addition, or in the alternative, the power supply 1138 can receive power from an independent power supply. The independent power supply can be any source of power that is independent of the power supply 1138. Examples of a power supply 1138 can include, but are not limited to, an energy storage device, a step-down transformer, a feed to a building, a feed from a circuit panel, and an independent generation source (e.g., photovoltaic panels, a heat exchanger).

In certain example embodiments, the power supply 1138 sends power, control, and/or communication signals to, and receives power, control, and/or communication signals from, the controller 1131 of the flame path sensor system 1130. In this way, the controller 1131 of the flame path sensor system 1130 can control the amount (12V, 1 A) and/or type (e.g., alternating current, direct current) of power sent by the power supply 1138 to the sensors 1170, the electrical circuit 1150, and/or the target 1140.

The controller 1131 of the electrical enclosure 1100 can interact (e.g., periodically, continually, randomly) with the user 1190, the network manager 1185 and/or one or more other components of the flame path sensor system 1130. The user 1190, the network manager 1185, and/or the other components of the flame path sensor system 1130 can interact with the controller 1131 using the application interface 1186 and/or the communication links 1112 in accordance with one or more example embodiments. For example, the application interface 1186 of the controller 1131 can receive data (e.g., information, communications, instructions) from and sends data (e.g., information, communications, instructions) to the user 1190 and the network manager 1185.

The controller 1131, the user 1190, and/or the network manager 1185 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 1131. Examples of such a system can include, but are not limited to, a desktop computer with LAN, WAN, Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 12.

Further, as discussed above, such a system can have corresponding software (e.g., user software, network manager software, control module software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, Local Area Network (LAN), Wide Area Network (WAN), or other network communication methods) and/or communication channels, with wire and/or wireless segments according to some example embodiments. The software of one system can be a part of, or operate separately but in conjunction with, the software of another system within the system 1110.

As discussed above, the electrical enclosure 1100 can include the enclosure body 1124 and the enclosure cover 1002. The enclosure body 1124 can include at least one wall that forms a cavity 1107, and the cavity 1107 becomes enclosed when the enclosure cover 1002 is coupled to the enclosure body 1124. The enclosure body 1124 of the electrical enclosure 1100 can be used to house one or more components (e.g., power supply 1138, sensors 1170, target 1140, electrical circuit 1150) of the system 1110, including one or more components of the controller 1131. For example, as shown in FIG. 11, the controller 1131 (which in this case includes the control engine 1183, the communication module 1177, the storage repository 1160, the hardware processor 1178, the memory 1182, the transceiver 1179, the application interface 1186, the timer 1189, the energy metering module 1184, the power module 1176, and the optional security module 1187) can be disposed within the cavity 1107 formed by the enclosure body 1124. In alternative embodiments, any one or more of these or other components (or portions thereof) of the electrical enclosure 1100 can be disposed on the enclosure body 1124 and/or remotely from the enclosure body 1124.

The storage repository 1160 can be a persistent storage device (or set of devices) that stores software and data used to assist the controller 1131 in communicating with the user 1190 and the network manager 1185 within the system 1110. In one or more example embodiments, the storage repository 1160 stores one or more protocols 1172 (which can include communication protocols), algorithms 1168, and stored data 1169. The protocols 1172 are generally a process or procedure (e.g., a series of method steps) by which the controller 1131 (or portions thereof) operates under a given set of conditions (e.g., time, readings by a sensor 1170, measurements by the energy metering module 1184).

When the protocols 1172 are communication protocols, the communication protocols can be any of a number of protocols that are used to send and/or receive data between the controller 1131, the user 1190, and the network manager 1185. One or more of the protocols 1172 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the protocols 1172 can provide a layer of security to the data transferred within the system 1110.

The algorithms 1168 can be any formulas, logic steps, mathematical models, and/or other similar processes that the control engine 1183 of the controller 1131 follows and/or calculates based on certain conditions at a point in time. For example, the controller 1131 can use an algorithm 1169 to measure (using the energy metering module 1184) one or more parameters (e.g., current) for power that flows through the electrical circuit 1150, compare this with the resulting amount of eddy current flowing through the target 1140 (as measured by a sensor 1170), and evaluate the width of an adjacent joint that traverses at least a portion of the electrical enclosure 1100.

As another example, the controller 1131 can use another algorithm 1168 to continuously monitor the measurements made by the sensors 1170, and use this data to determine the operating parameters of the flame path sensor system 1130. As another example, the controller 1131 can use yet another algorithm 1168 to measure one or more parameters (e.g., level of eddy current) of the flame path sensor system 1130, and use this data to determine whether one or more characteristics (e.g., the width of a flame path) is within acceptable parameters (also called threshold values, and also part of the stored data 1169).

Stored data 1169 can be any data associated with the electrical enclosure 1100 (including any components thereof), any measurements taken by the sensors 1170, measurements taken by the energy metering module 1184, time measured by the timer 1189, stored data 1169 (e.g., threshold values, historical measured values), current ratings for the power supply 1138, nameplate information associated with the various components (e.g., target 1140, electrical circuit 1150, sensors 1170) within the electrical enclosure 1100, performance history of the one or more of the various components within the electrical enclosure 1100, results of previously run or calculated algorithms 1168, and/or any other suitable data. The stored data 1169 can be associated with some measurement of time derived, for example, from the timer 1189.

Examples of a storage repository 1160 can include, but are not limited to, a database (or a number of databases), a file system, a hard drive, flash memory, some other form of solid state data storage, or any suitable combination thereof. The storage repository 1160 can be located on multiple physical machines, each storing all or a portion of the protocols 1172, the algorithms 1168, and/or the stored data 1169 according to some example embodiments. Each storage unit or device can be physically located in the same or in a different geographic location.

The storage repository 1160 can be operatively connected to the control engine 1183. In one or more example embodiments, the control engine 1183 includes functionality to communicate with the user 1190 and the network manager 1185 in the system 1110. More specifically, the control engine 1183 sends information to and/or receives information from the storage repository 1160 in order to communicate with the user 1190 and the network manager 1185. As discussed below, the storage repository 1160 can also be operatively connected to the communication module 1177 in certain example embodiments.

In certain example embodiments, the control engine 1183 of the controller 1131 controls the operation of one or more components (e.g., the communication module 1177, the timer 1189, the transceiver 1179) of the controller 1131. For example, the control engine 1183 can put the communication module 1177 in "sleep" mode when there are no communications between the controller 1131 and another component (e.g., the user 1190) in the system 1110 or when communications between the controller 1131 and another component in the system 1110 follow a regular pattern. In such a case, power consumed by the controller 1131 is conserved by only enabling the communication module 1177 when the communication module 1177 is needed.

As another example, the control engine 1183 can acquire the current time using the timer 1189. The timer 1189 can enable the controller 1131 to control the power supply 1138 (and so also the flame path sensor system 1130) of the electrical enclosure 1100, even when the controller 1131 has no communication with the user 1190 and/or the network manager 1185. In certain example embodiments, the timer 1189 can track the amount of time that the flame path sensor system 1130 (including any one or more components thereof) is operating. In such a case, the control engine 1183 can control the power supply 1138 (and so also the flame path sensor system 1130) based on an amount of time measured by the timer 1189.

In addition to the aspects and capabilities of the controller 1131 described above, the control engine 1183 of the controller 1131 can provide direct or indirect control of any aspect of operation of the flame path sensor system 1130. For example, the control engine 1183 can control the operation of a sensor 1170, the target 1140, the power supply 1138, and/or any other component within the cavity 1107 of the electrical enclosure 1100.

In certain example embodiments, the control engine 1183 of the controller 1131 controls the power supply 1138 to regulate the timing and amount of current that the power supply 1138 sends through one or more of the electrical circuits 1150. The control engine 1183 can also control one or more of the sensors 1170 to measure an amount of eddy current that flows through one or more of the targets 1140. The control engine 1183 can also determine, using measurements made by the sensors 1170 and data stored in the storage repository 1160, an amount of corrosion that is occurring in a target 1140, and subsequently use one or more algorithms 1168 to determine whether the width of the adjacent joint in the enclosure is within a proper range.

In certain example embodiments, the control engine 1183 can analyze data stored in the storage repository 1160 using one or more algorithms 1168 stored in the storage repository 1160. In this way, the control engine 1183 can provide a historical analysis and/or a predictive analysis to a user 1190 and/or the network manager 1185 regarding the flame path sensor system 1130 and/or the width of a joint of the electrical enclosure 1100. In such a case, for example, the control engine 1183 can establish a preventative maintenance program for the electrical enclosure 1100, including any specific components (e.g., the power supply 1138, a component of the flame path sensor system 1130) thereof.

The control engine 1183 can provide control, communication, and/or other similar signals to the user 1190 and/or the network manager 1185. Similarly, the control engine 1183 can receive control, communication, and/or other similar signals from the user 1190 and/or the network manager 1185. The control engine 1183 can control the flame path sensor system 1130 automatically (for example, based on one or more algorithms 1168 and/or protocols 1172 stored in the storage repository 1160) and/or based on control, communication, and/or other similar signals received from of another component (e.g., the network manager 1185) of the system 1110 through the communication links 1112. The control engine 1183 may include a printed circuit board, upon which the hardware processor 1178 and/or one or more discrete components of the controller 1131 can be positioned.

In certain example embodiments, the control engine 1183 can include an interface that enables the control engine 1183 to communicate with one or more components (e.g., communication module 1177) of the electrical enclosure 1100 and/or another component (e.g., the user 1190, the network manager 1185) of the system 1110. Such an interface can operate in conjunction with, or independently of, the protocols 1172 used to communicate between the controller 1131, the user 1190, and/or the network manager 1185.

The control engine 1183 can operate in real time. In other words, the control engine 1183 of the controller 1131 can process, send, and/or receive communications with the user 1190 and/or the network manager 1185 as any changes (e.g., discrete, continuous) occur within the system 1110. Further, the control engine 1183 of the controller 1131 can, at substantially the same time, control the flame path sensor system 1130 (including, for example, a sensor 1170 and an electrical circuit 1150), the power supply 1138, and the network manager 1185 based on such changes. In addition, the control engine 1183 of the controller 1131 can perform one or more of its functions continuously. For example, the controller 1131 can continuously use and update protocols 1172 and/or algorithms 1168. As another example, the controller 1131 can continuously control the power supply 1138 of the electrical enclosure 1100. In such a case, any updates or changes can be used by the controller 1131 in adjusting a component of the flame path sensor system 1130 in real time.

The control engine 1183 (or other components of the controller 1131) can also include one or more hardware and/or software architecture components to perform its functions. Such components can include, but are not limited to, a universal asynchronous receiver/transmitter (UART), a universal synchronous receiver/transmitter (USRT), a serial peripheral interface (SPI), a direct-attached capacity (DAC) storage device, an analog-to-digital converter, an inter-integrated circuit ($I^2C$), and a pulse width modulator (PWM).

In certain example embodiments, the communication module 1177 of the controller 1131 determines and implements the communication protocol (e.g., from the protocols 1172 of the storage repository 1160) that is used when the control engine 1183 communicates with (e.g., sends signals to, receives signals from) a sensor 1170, the user 1190, the network manager 1185, and/or any other component of the system 1110. In some cases, the communication module 1177 accesses the protocols 1172 and/or the algorithms 1168 to determine which communication protocol is within the capability of the recipient of a communication sent by the control engine 1183. In addition, the communication module 1177 can interpret the communication protocol of a communication received by the controller 1131 so that the control engine 1183 can interpret the communication.

The communication module 1177 can send data directly to and/or retrieve data directly from the storage repository 1160. Alternatively, the control engine 1183 can facilitate the transfer of data between the communication module 1177 and the storage repository 1160. The communication module 1177 can also provide encryption to data that is sent by the controller 1131 and decryption to data that is received by the controller 1131. The communication module 1177 can also provide one or more of a number of other services with respect to data sent from and received by the controller 1131. Such services can include, but are not limited to, data packet routing information and procedures to follow in the event of data interruption.

The timer 1189 of the controller 1131 can track clock time, intervals of time, an amount of time, and/or any other measure of time. The timer 1189 can also count the number of occurrences of an event, whether with or without respect to time. Alternatively, the control engine 1183 can perform the counting function. The timer 1189 is able to track multiple time measurements concurrently. The timer 1189 can track time periods based on an instruction received from the control engine 1183, based on an instruction received from the user 1190, based on an instruction programmed in the software for the controller 1131, based on some other condition or from some other component, or from any combination thereof.

The timer 1189 can be configured to track time when there is no power delivered to the controller 1131 (e.g., the power module 1176 malfunctions) using, for example, a super capacitor or a battery backup. In such a case, when there is a resumption of power delivery to the controller 1131, the timer 1189 can communicate any aspect of time to the controller 1131. In such a case, the timer 1189 can include one or more of a number of components (e.g., a super capacitor, an integrated circuit) to perform these functions.

The energy metering module 1184 of the controller 1131 measures one or more components of energy (e.g., current, voltage, resistance, VARs, watts) associated with the electrical enclosure 1100 (including the power supply 1138) at one or more points in the system 1110. The energy metering module 1184 can include any of a number of measuring devices and related devices, including but not limited to a voltmeter, an ammeter, a power meter, an ohmmeter, a current transformer, a potential transformer, and electrical wiring. The energy metering module 1184 can measure a component of energy continuously, periodically, based on the occurrence of an event, based on a command received from the control engine 1183, based on measurements captured by the sensors 1170, and/or based on some other factor.

The power module 1176 of the controller 1131 provides power to one or more other components (e.g., timer 1189, control engine 1183) of the controller 1131. In certain example embodiments, the power module 1176 receives power from the power supply 1138. The power module 1176 can include one or more of a number of single or multiple discrete components (e.g., transistor, diode, resistor), and/or a microprocessor. The power module 1176 may include a printed circuit board, upon which the microprocessor and/or one or more discrete components are positioned. In some cases, the power module 1176 can include one or more components that allow the power module 1176 to measure one or more elements of power (e.g., voltage, current) that is delivered to and/or sent from the power module 1176, The power module 1176 can include one or more components (e.g., a transformer, a diode bridge, an inverter, a converter) that receives power (for example, through an electrical cable) from a source (e.g., the power supply 1138) and generates power of a type (e.g., alternating current, direct current) and level (e.g., 12V, 24V, 120V) that can be used by the other components of the controller 1131. The power module 1176 can use a closed control loop to maintain a preconfigured voltage or current with a tight tolerance at the output. The power module 1176 can also protect the rest of the electronics (e.g., hardware processor 1178, transceiver 1179) from surges generated in the line. In addition, or in the alternative, the power module 1176 can be a source of power in itself to provide signals to the other components of the controller 1131. For example, the power module 1176 can be a battery. As another example, the power module 1176 can be a localized photovoltaic power system.

The hardware processor 1178 of the controller 1131 executes software in accordance with one or more example embodiments. Specifically, the hardware processor 1178 can execute software on the control engine 1183 or any other portion of the controller 1131, as well as software used by the user 1190 and/or the network manager 1185. The hardware processor 1178 can be an integrated circuit, a central processing unit, a multi-core processing chip, a multi-chip module including multiple multi-core processing chips, or other hardware processor in one or more example embodiments. The hardware processor 1178 is known by other names, including but not limited to a computer processor, a microprocessor, and a multi-core processor.

In one or more example embodiments, the hardware processor 1178 executes software instructions stored in memory 1182. The memory 1182 includes one or more cache memories, main memory, and/or any other suitable type of memory. The memory 1182 is discretely located within the controller 1131 relative to the hardware processor 1178 according to some example embodiments. In certain configurations, the memory 1182 can be integrated with the hardware processor 1178.

In certain example embodiments, the controller 1131 does not include a hardware processor 1178. In such a case, the controller 1131 can include, as an example, one or more field programmable gate arrays (FPGA) and/or one or more insulated-gate bipolar transistors (IGBTs). As another example, the controller 1131 can include one or more integrated circuits (ICs). Using FPGAs, IGBTs, ICs, and/or other similar devices known in the art allows the controller 1131 (or portions thereof) to be programmable and function according to certain logic rules and thresholds without the use of a hardware processor. Alternatively, FPGAs, IGBTs, ICs, and/or similar devices can be used in conjunction with one or more hardware processors 1178.

The transceiver 1179 of the controller 1131 can send and/or receive control and/or communication signals. Specifically, the transceiver 1179 can be used to transfer data between the controller 1131, the user 1190, the network manager 1185, and/or other components of the flame path sensor system 1130. The transceiver 1179 can use wired and/or wireless technology. The transceiver 1179 can be configured in such a way that the control and/or communication signals sent and/or received by the transceiver 1179 can be received and/or sent by another transceiver that is part of the user 1190, the network manager 1185, and/or one or more other components (e.g., a sensor 1170) of the flame path sensor system 1130.

When the transceiver 1179 uses wireless technology as the communication link 1112, any type of wireless technology can be used by the transceiver 1179 in sending and receiving signals. Such wireless technology can include, but is not limited to, Wi-Fi, visible light communication, cellular networking, and Bluetooth. The transceiver 1179 can use one or more of any number of suitable communication protocols (e.g., ISA100) when sending and/or receiving signals. Such communication protocols can be dictated by the communication module 1177. Further, any transceiver information for the user 1190, the network manager 1185, and/or one or more other components (e.g., a sensor 1170) of the flame path sensor system 1130 can be stored in the storage repository 1160.

Optionally, in one or more example embodiments, the security module 1187 secures interactions between the controller 1131, the user 1190, the network manager 1185, and/or one or more other components (e.g., a sensor 1170) of the flame path sensor system 1130. More specifically, the security module 1187 authenticates communication from software based on security keys verifying the identity of the source of the communication. For example, user software may be associated with a security key enabling the software of the user 1190 to interact with the controller 1131 and/or the network manager 1185. Further, the security module 1187 can restrict receipt of information, requests for information, and/or access to information in some example embodiments.

Figure 12:
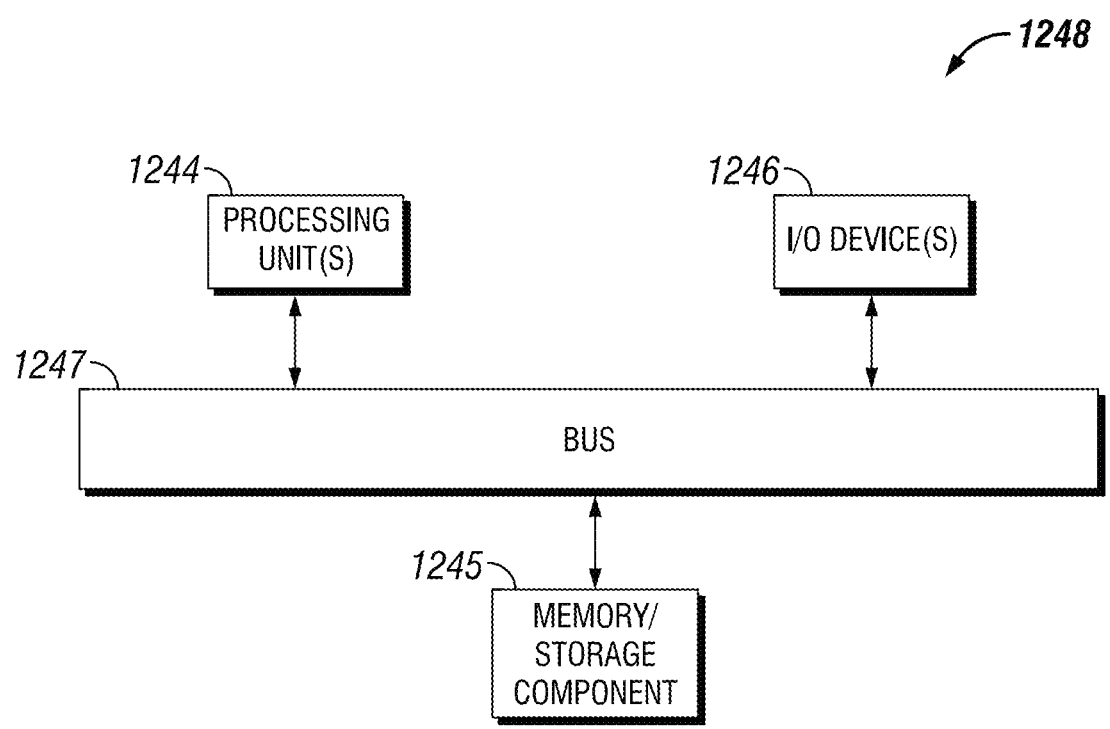
FIG. 12 shows a computing device in accordance with certain example embodiments.

One or more of the functions performed by any of the components (e.g., controller 1131) of an example flame path sensor system 1130 can be performed using a computing device 1248. An example of a computing device 1248 is shown in FIG. 12. The computing device 1248 implements one or more of the various techniques described herein, and which is representative, in whole or in part, of the elements described herein pursuant to certain example embodiments. Computing device 1248 is one example of a computing device and is not intended to suggest any limitation as to scope of use or functionality of the computing device and/or its possible architectures. Neither should computing device 1248 be interpreted as having any dependency or requirement relating to any one or combination of components illustrated in the example computing device 1248.

Computing device 1248 includes one or more processors or processing units 1244, one or more memory/storage components 1245, one or more input/output (I/O) devices 1246, and a bus 1247 that allows the various components and devices to communicate with one another. Bus 1247 represents one or more of any of several types of bus structures, including a memory bus or memory controller, a peripheral bus, an accelerated graphics port, and a processor or local bus using any of a variety of bus architectures. Bus 1247 includes wired and/or wireless buses.

Memory/storage component 1245 represents one or more computer storage media. Memory/storage component 1245 includes volatile media (such as random access memory (RAM)) and/or nonvolatile media (such as read only memory (ROM), flash memory, optical disks, magnetic disks, and so forth). Memory/storage component 1245 includes fixed media (e.g., RAM, ROM, a fixed hard drive, etc.) as well as removable media (e.g., a Flash memory drive, a removable hard drive, an optical disk, and so forth).

One or more I/O devices 1246 allow a customer, utility, or other user to enter commands and information to computing device 1248, and also allow information to be presented to the customer, utility, or other user and/or other components or devices. Examples of input devices include, but are not limited to, a keyboard, a cursor control device (e.g., a mouse), a microphone, and a scanner. Examples of output devices include, but are not limited to, a display device (e.g., a monitor or projector), speakers, a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 1248 is connected to a network (not shown) (e.g., a local area network (LAN), a wide area network (WAN) such as the Internet, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 1248 includes at least the minimal processing, input, and/or output means necessary to practice one or more embodiments.

Further, those skilled in the art will appreciate that one or more elements of the aforementioned computer device 1248 is located at a remote location and connected to the other elements over a network in certain example embodiments. Further, one or more embodiments is implemented on a distributed system having one or more nodes, where each portion of the implementation (e.g., controller 1131) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

While example embodiments discussed above apply to situations when an enclosure is in a static state (prior to an internal explosion), example embodiments can also be used to provide information when an enclosure is in a dynamic state. For example, example embodiments can monitor the deflection of the flame path of an enclosure in real time during an explosive event. This would provide finer resolution to the integrity of the fastening devices (e.g., whether the fastening devices were torqued sufficiently).

Example embodiments can provide for measuring and monitoring the width of a joint (e.g., flame path) within explosion-proof enclosures. Specifically, certain example embodiments can use an electrical circuit. When current flows through the electrical circuit, a magnetic field is generated and emanates from the electrical circuit. By placing a target proximate to the electrical circuit, the magnetic field can induce eddy currents in the target. These eddy currents generate a magnetic field that opposes the magnetic field emanating from the electrical circuit. As the distance between the target and the electrical circuit changes, the strength of the net magnetic field, measured by a sensor, also changes. By tracking the magnitude of the net magnetic field over time, example embodiments can indicate whether the width of a joint is within acceptable limits.

By actively monitoring the integrity of a joint (e.g., flame path) in an explosion-proof (or any other type of) enclosure, example embodiments can inform a user when an explosion-proof enclosure, marine enclosure, and/or any other enclosure is changing and/or failing. In some cases, example embodiments can determine when a joint of an enclosure that is subject to industry standards becomes non-compliant with those applicable industry standards, thus becoming a safety hazard. Example embodiments can include a controller that communicates with the sensor board. In such a case, the controller can interactively communicate with a user (e.g., through an alarm, an indicating light), a network manager, a maintenance department, an inventory management system, and/or any other entity that can be involved in the dissemination of information regarding the explosion-proof enclosure.

As stated above, example embodiments can be used in a number of applications and/or with a number of enclosures. For example, example embodiments can be used to determine whether a window is fully closed and/or whether the gap between the window and a frame is changing over time (with or without adjustments to temperature). As another example, example embodiments can be used to determine whether a tire rim is properly coupled to a hub and/or whether the gap between the hub and the rim is changing over time (with or without adjustments to temperature) as an indication of whether the fastening devices (e.g., lug nuts) used to couple the two together are sufficiently tightened. As yet another example, example embodiments can be used to determine whether a door of an aircraft is properly sealed and closed and/or whether the seal between the door and the fuselage is failing over time (with or without adjustments to temperature).

Generally speaking, example embodiments are used to determine the gap (also called a joint) between two surfaces of some enclosure. For example, as explained above, when the enclosure is an explosion-proof enclosure, the gap or joint is the flame path, and in that case, the width of the flame path is of particular importance for compliance purposes. In a number of other applications, the status (e.g., width) of the gap or joint formed between two surfaces of an enclosure can be determined using example embodiments. In such a case, the two surfaces can abut against each other or can be disposed in close proximity to each other.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A system within an electrical housing, the system comprising:
    an electrical circuit through which a first current flows, wherein the first current creates a magnetic field, wherein the electrical circuit is disposed proximate to a joint of the electrical housing;
    a target disposed proximate to the electrical circuit, wherein the magnetic field induces a plurality of second currents to flow within the target; and
    a sensor that measures the plurality of second currents flowing within the target to generate a plurality of measurements,
    wherein the plurality of measurements indicates a width of the joint of the electrical housing,
    wherein the target forms, at least in part, the joint of the electrical housing, and
    wherein the joint is non-uniform along an outer surface of the target that forms the joint.

2. The system of claim 1, wherein the target is a portion of a body or a cover of the electrical housing.

3. The system of claim 1, further comprising:
    an additional electrical circuit disposed proximate to the joint and through which a third current flows, wherein the third current creates an additional magnetic field;
    an additional target disposed proximate to the additional electrical circuit, wherein the additional magnetic field induces a plurality of fourth currents to flow within the additional target, and wherein the additional target further forms the joint of the electrical housing; and
    an additional sensor that measures the plurality of fourth currents flowing within the additional target to generate a plurality of additional measurements,
    wherein the plurality of additional measurements indicates the width of the joint.

4. The system of claim 1, wherein the electrical circuit and the sensor are part of a same device.

5. The system of claim 1, wherein the electrical circuit and the sensor comprise a non-corrosive material.

6. The system of claim 1, wherein the electrical circuit and the sensor are hermetically sealed.

7. The system of claim 1, wherein the plurality of measurements are taken over time and indicates that the joint of the electrical housing is falling outside a range of acceptable values.

8. The system of claim 1, wherein the plurality of second currents are eddy currents.

9. The system of claim 1, further comprising:
    a controller coupled to the sensor, wherein the controller determines the width of the joint based on the plurality of measurements and communicates the width of the joint of the electrical housing to a user.

10. The system of claim 9, wherein the controller is further coupled to the electrical circuit, wherein the controller controls the first current flowing through the electrical circuit.

11. The system of claim 1, wherein the electrical circuit is an inductor.

12. The system of claim 1, wherein the joint is a flame path, and wherein the electrical housing is an explosion-proof enclosure.

13. The system of claim 1, wherein the electrical circuit is disposed within a sleeve, wherein the sleeve is disposed within an aperture that traverses a wall of the electrical housing.

14. The system of claim 1, wherein the electrical circuit and the sensor are mounted on a platform disposed adjacent to the joint.

15. The system of claim 1, wherein the electrical circuit and the sensor are mounted within a recess in a wall of the electrical housing, wherein the recess is part of an aperture that traverses a wall of the electrical housing.

16. An explosion-proof enclosure comprising:
- an enclosure body comprising at least one wall that forms a cavity, wherein the enclosure body further comprises a first flange;
- an enclosure cover coupled to the enclosure body, wherein the enclosure cover comprises a second flange, wherein the first flange is disposed adjacent to the second flange when the enclosure body is coupled to the enclosure cover, wherein the first flange and the second flange form a flame path therebetween when the enclosure body is coupled to the enclosure cover; and
- a joint sensing system comprising:
  - an electrical circuit disposed proximate to the flame path, wherein the electrical circuit has a first current that flows therethrough, wherein the first current creates a magnetic field;
  - a target disposed proximate to the electrical circuit, wherein the magnetic field induces a plurality of second currents to flow within the target of the enclosure; and
  - a sensor that measures the plurality of second currents flowing within the target to generate a plurality of measurements,
  - wherein the plurality of measurements indicates a width of the flame path.

17. The explosion-proof enclosure of claim 16, wherein the joint sensing system further comprises a controller, wherein the controller is coupled to the sensor, wherein the controller determines the width of the joint based on the plurality of measurements measured by the sensor.

18. A joint sensing system within an electrical housing, the joint sensing system comprising:
- an electrical circuit through which a first current flows, wherein the first current creates a magnetic field, wherein the electrical circuit is disposed proximate to a joint of the electrical housing;
- a target disposed proximate to the electrical circuit, wherein the magnetic field induces a plurality of second currents to flow within the target;
- a sensor that measures the plurality of second currents flowing within the target to generate a plurality of measurements;
- an additional electrical circuit disposed proximate to the joint and through which a third current flows, wherein the third current creates an additional magnetic field;
- an additional target disposed proximate to the additional electrical circuit, wherein the additional magnetic field induces a plurality of fourth currents to flow within the additional target, and wherein the additional target further forms the joint of the electrical housing; and
- an additional sensor that measures the plurality of fourth currents flowing within the additional target to generate a plurality of additional measurements,
- wherein the plurality of measurements indicates a width of the joint of the electrical housing, and
- wherein the plurality of additional measurements further indicates the width of the joint of the electrical housing.

* * * * *